US009115237B2

(12) United States Patent
McDougall et al.

(10) Patent No.: US 9,115,237 B2
(45) Date of Patent: Aug. 25, 2015

(54) VISCOSITY IMPROVER GRAFTED WITH UNSATURATED ACYLATING AGENT AND AN ARYLOXYALYLKENE MONOAMINE

(75) Inventors: Patrick J. McDougall, San Ramon, CA (US); Pritesh A. Patel, San Ramon, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 449 days.

(21) Appl. No.: 13/552,545

(22) Filed: Jul. 18, 2012

(65) Prior Publication Data
US 2014/0024567 A1 Jan. 23, 2014

(51) Int. Cl.
*C10M 149/00* (2006.01)
*C08F 255/04* (2006.01)
*C10M 149/12* (2006.01)

(52) U.S. Cl.
CPC ............ *C08F 255/04* (2013.01); *C10M 149/12* (2013.01); *C10M 2217/024* (2013.01); *C10M 2217/028* (2013.01); *C10M 2217/04* (2013.01); *C10M 2217/06* (2013.01)

(58) Field of Classification Search
CPC ..................... C10M 2217/04; C10M 2217/06; C10M 2217/028; C10M 2217/024
USPC ........................... 508/287–295, 221, 232–241
See application file for complete search history.

(56) References Cited

U.S. PATENT DOCUMENTS

| | | | |
|---|---|---|---|
| 2,421,837 A | 6/1947 | Hardman et al. | |
| 2,974,160 A | 3/1961 | Heininger et al. | |
| 3,236,614 A | 2/1966 | Young, et al. | |
| 3,275,629 A * | 9/1966 | Baizer ........................... | 544/174 |
| 3,316,177 A | 4/1967 | Dorer | |
| 3,554,911 A | 1/1971 | Schiff | |
| 3,862,265 A | 1/1975 | Steinkamp et al. | |
| 3,959,161 A | 5/1976 | Dawans et al. | |
| 4,073,737 A | 2/1978 | Elliott et al. | |
| 4,137,185 A | 1/1979 | Gardiner et al. | |
| 4,247,301 A | 1/1981 | Honnen et al. | |
| 4,320,019 A | 3/1982 | Hayashi | |
| 4,332,595 A | 6/1982 | Herbstman | |
| 4,477,362 A | 10/1984 | Steckel et al. | |
| 4,735,736 A | 4/1988 | Chung | |
| 4,804,794 A | 2/1989 | Ver Strate et al. | |
| 4,863,623 A | 9/1989 | Nalesnik | |
| 5,030,755 A | 7/1991 | Ataka et al. | |
| 5,043,083 A | 8/1991 | Calcord et al. | |
| 5,075,383 A | 12/1991 | Migdal et al. | |
| 5,112,364 A | 5/1992 | Rath et al. | |
| 5,219,480 A | 6/1993 | Gutierrez et al. | |
| 5,276,192 A | 1/1994 | Su et al. | |
| 5,348,673 A | 9/1994 | Chung | |
| 5,424,367 A | 6/1995 | Auda et al. | |
| 5,427,702 A | 6/1995 | Chung | |
| 5,429,757 A | 7/1995 | Mishra et al. | |
| 5,523,008 A | 6/1996 | Boden et al. | |
| 5,552,096 A | 9/1996 | Auda et al. | |
| 5,563,118 A * | 10/1996 | Mishra et al. ................. | 508/454 |
| 5,565,161 A | 10/1996 | Auda et al. | |
| 5,663,126 A | 9/1997 | Boden et al. | |
| 5,669,939 A | 9/1997 | Cherpeck | |
| 5,814,586 A | 9/1998 | Boden et al. | |
| 5,837,773 A | 11/1998 | Olivier et al. | |
| 5,874,389 A | 2/1999 | Boden et al. | |
| 5,942,471 A | 8/1999 | Kapuscinski et al. | |
| 6,034,184 A | 3/2000 | Coolbaugh et al. | |
| 6,107,257 A | 8/2000 | Valcho et al. | |
| 6,162,768 A | 12/2000 | Coolbaugh et al. | |
| 6,211,332 B1 | 4/2001 | Tanaglia | |
| 6,215,033 B1 | 4/2001 | Coolbaugh et al. | |
| 6,217,624 B1 | 4/2001 | Morris et al. | |
| 6,248,702 B1 | 6/2001 | Coolbaugh et al. | |
| 6,300,289 B1 | 10/2001 | Boden et al. | |
| 6,362,286 B1 | 3/2002 | Gardiner | |
| 6,384,280 B1 | 5/2002 | Cherpeck et al | |
| 6,410,652 B1 | 6/2002 | Goldblatt et al. | |
| 6,486,352 B1 | 11/2002 | Gray | |
| 6,649,800 B1 | 11/2003 | Gray | |
| 6,686,321 B2 | 2/2004 | Boden et al. | |
| 6,875,816 B2 | 4/2005 | De Groot et al. | |
| 6,942,342 B2 | 9/2005 | Raasch | |
| 7,371,713 B2 | 5/2008 | Goldblatt | |
| 7,790,661 B2 | 9/2010 | Covitch et al. | |

(Continued)

FOREIGN PATENT DOCUMENTS

| | | |
|---|---|---|
| DE | 19711004 A1 | 10/1997 |
| EP | 0678 569 | 10/1995 |

(Continued)

OTHER PUBLICATIONS

PCT/US2013/042880, International Search Report, Dec. 2, 2013, 2 pgs.
Macromolecules, an Introduction to Polymer Science, F. A. Bovey and F. H. Winslow, Editors, Academic Press (1979), pp. 296-312.
Encyclopedia of Polymer Science and Engineering, vol. 2, pp. 550-586 and vol. 8, pp. 499-532, Wiley-Interscience (1986).
Turnbull Scriven, Chemical Reviews, vol. 88, pp. 297-368, 1988.
Ham and Dermer, "Ethyleneimine and Other Aziridines", Academic Press, New York, 1969, pp. 224-227 and 256-257.
K.H. Takemura J. Am. Chem. Soc. 69, vol. 32, 2343 (1947).
P. N. Rylander, Catalytic Hydrogenation in Organic Synthesis, Second Edition, pp. 138-152, Academic Press (1979).
H. F. Rase, Handbook of Commercial Catalysts, Heterogeneous Catalyst, pp. 138-148, CRC Press (2000).

*Primary Examiner* — Ellen McAvoy
(74) *Attorney, Agent, or Firm* — Joseph P. Foley

(57) ABSTRACT

Disclosed is an oil-soluble lubricating oil additive composition, suitable for use as a dispersant viscosity index improver in lubricating oils; prepared by the process which comprises reacting a hydrocarbon polymer having a number average molecular weight ($M_n$) between about 7,000 and about 500,000 wherein the polymer backbone has been functionalized with an ethylenically unsaturated acylating agent and an aryloxy-alkylene amine.

25 Claims, No Drawings

(56) References Cited

U.S. PATENT DOCUMENTS

| | | |
|---|---|---|
| 7,960,320 B2 * | 6/2011 | Covitch et al. ............... 508/221 |
| 7,999,039 B2 | 8/2011 | De Groot et al. |
| 2003/0150154 A1 | 8/2003 | Cherpeck |
| 2006/0199896 A1 | 9/2006 | Walton et al. |
| 2008/0293600 A1 * | 11/2008 | Goldblatt et al. ............ 508/221 |
| 2009/0247706 A1 | 10/2009 | Krista et al. |

FOREIGN PATENT DOCUMENTS

| | | |
|---|---|---|
| EP | 0781 794 | 7/1997 |
| JP | 2592732 B2 | 3/1997 |

* cited by examiner

VISCOSITY IMPROVER GRAFTED WITH UNSATURATED ACYLATING AGENT AND AN ARYLOXYALYLKENE MONOAMINE

FIELD OF INVENTION

This is directed to performance improving additives for lubricating oils. In particular, the invention relates to polymeric additives useful for improving viscosity, dispersancy, and wear characteristics when employed in lubricating oils compositions.

BACKGROUND

Hydrocarbon polymers, particularly ethylene-alpha olefin copolymers, are in widespread use as viscosity index (V.I.) improving additives for oil compositions, particularly lubricating oil compositions. A substantial body of prior art exists directed towards further reacting these ethylene-alpha olefin copolymer V.I. improvers to form a multi-functional V.I. improver. This multi-functional V.I. Improver additive is used to improve not only the V.I. properties of the oil but often to also impart dispersancy so as to suspend soot or sludge that may form during the operation or use of the lubricant in engines. Other multi-functional V.I. improvers have also been reported to impart antiwear and antioxidant properties, both of which are very useful for sustained engine operation.

The most common method to preparing dispersant V.I. improvers involves first grafting ethylene-alpha olefin copolymers with an ethylenically unsaturated component, typically maleic anhydride, followed by reaction of the grafted polymer with a polyamine. The polyamine used to impart the multifunctional characteristics can be highly variable in nature and includes the use of polyamines that are both aliphatic and aromatic in nature.

Many patents disclose the use of alkylene polyamines with grafted copolymers. U.S. Pat. No. 3,316,177, issued Apr. 25, 1967 to Dorer, teaches the use of alkylene polyamines with ethylene-propylene copolymers grafted with maleic anhydride. This composition is taught to be a useful additive for fuels, lubricants and petroleum fractions to inhibit the formation of harmful deposits.

U.S. Pat. No. 4,160,739, issued Jul. 10, 1979, to Stambaugh et al. discloses graft copolymers wherein the backbone polymer is a polymeric hydrocarbon such as substantially linear ethylene-propylene copolymer and the grafted units are the residues of a monomer system comprising maleic acid or anhydride and one or more other monomers copolymerizable therewith. The graft copolymer system is post-reacted with a polyamine compound comprising a primary or secondary amine. The graft copolymers are stated to impart combined, detergent, viscosity index improvement and other useful properties to lubricating oils and hydrocarbon motor fuels.

U.S. Pat. No. 4,735,736, issued Apr. 5, 1988, to Chung discloses oil-soluble ethylene-alpha olefin hydrocarbon polymers, useful as V.I. improvers, preferably ethylene-propylene copolymer, grafted with an unsaturated acid material, such as maleic anhydride, followed by reaction with a polyamine, preferably a tertiary-primary amine, and treatment and/or reaction with aliphatic monoamine. The resulting material is used in oil compositions, such as lubricating oil, as a viscosity index improver having sludge dispersancy properties. The monoamine treatment is stated to inhibit viscosity growth of the additive upon storage.

Polyamines containing aromatic functionality are also well described in the patent literature. U.S. Pat. No. 4,863,623, issued Sep. 5, 1989, to Nalesnik discloses an additive composition comprising a graft and an amine-derivatized copolymer prepared from ethylene and at least one $C_3$ to $C_{10}$ alpha-monoolefin which has been reacted with at least one olefinic carboxylic acid acylating agent to form one or more acylating reaction intermediates characterized by having a carboxylic acid acylating group within their structure and reacting the reaction intermediate with an amino-aromatic polyamine compound from the group consisting of an N-arylphenylenediamine, an aminothiazole, an aminocarbazole, an aminoindole, an aminopyrrole, an amino-indazolinone, an aminomercaptotriazole and an aminopyrimidine to form the graft and amine-derivatized copolymer. A lubricating oil composition containing the amine-derivatized copolymer is also disclosed.

U.S. Pat. No. 5,429,757, issued Jul. 4, 1995, and U.S. Pat. No. 5,563,118, issued Oct. 8, 1996, to Mishra et al. disclose an additive composition comprising a graft and derivatized copolymer prepared from an ethylene-alpha-olefin copolymer which has been reacted with at least one olefinic carboxylic acid acylating agent to form one or more acylating reaction intermediates and reacting the reaction intermediate with an amino-aromatic compound. A lubricating oil composition containing the same is also provided.

U.S. Pat. No. 5,942,471, issued Aug. 24, 1999 to Kapuscinski et al., discloses the preparation of dispersant olefin copolymers that also have antioxidant properties. This example uses specific aromatic polyamines such as phenothiazines and N-phenyl-p-phenylenediamine that are reacted in combination with ethylene-propylene copolymers that have been grafted with an ethylenically unsaturated group. The additive composition is said to impart V.I. improver, dispersancy, antiwear, and antioxidant properties when used in a lubricating oil.

The use of monoamines with copolymers grafted with ethylenically unsaturated groups is also described, though to a lesser extent than polyamine functionality. U.S. Pat. No. 7,790,661 B2, issued Sep. 7, 2010 to Covitch et al., teaches the use of several aromatic monoamines to prepare functionalized polymers with improved soot handling performance when used in a lubricating oil.

U.S. Pat. No. 5,219,480, issued Jun. 15, 1993 to Gutierrez et al., teaches the use of Mannich base condensates formed from, the reaction of at least one N-hydroxyaryl amine, an aldehyde, and a monosecondary amine. These condensates are useful functional groups for graft copolymers of ethylene and propylene to impart dispersant properties to the V.I. improver polymer.

SUMMARY

The present invention is directed in part to a polymeric additive which may be added to lubricating oils and contributes to improvements in the viscosity characteristics, the dispersancy and amelioration of soot thickening, and to improving wear characteristics when employed for example in lubricating oil formulations for mechanical equipment.

Accordingly, disclosed is an oil-soluble lubricating oil additive composition prepared by the process which comprises reacting: (a) a hydrocarbon polymer having a number average molecular weight ($M_n$) between about 7,000 and about 500,000 (b) an ethylenically unsaturated acylating agent; and (c) an aryloxy-alkylene amine is of the formula Ar—O-Alk-$NH_2$ wherein Ar is an aromatic moiety selected from benzene, naphthylene or anthracene or optionally substituted benzene, optionally substituted naphthylene or optionally substituted anthracene, wherein the optionally substituted groups are selected from 1 to 3 substituent groups selected from alkyl, alkoxy, aryl, alkaryl, arylalkyl, aryloxy, wherein alkyl is straight or branched chain carbon having 6 carbon atoms or less; and -Alk- comprises straight and branched chain alkylene groups having 1 to 10 carbon atoms, which may optionally be substituted with a group consisting of phenyl and benzyl. Included are mixtures of polymer backbones, mixtures of acylating agents and/or mixtures of aryloxy-alkaline amines. In one aspect, the polymer is first reacted (i.e. functionalized or grafted) with an ethylenically unsaturated acylated agent to form a grafted polymer intermediate which is reacted with the aryloxy-alkylene amine. In another aspect, the ethylenically unsaturated acylated agent is first reacted with the aryloxy-alkylene amine to form a reaction product wherein the reaction Product is grafted to the polymer backbone. In this regard, the oil-soluble lubricating oil additive composition is a grafted oil-soluble lubricating oil additive composition.

In one aspect, the hydrocarbon polymer is a homopolymer or copolymer selected from the group consisting of: (1) polymers of aliphatic olefins having from 2 to about 28 carbon atoms; (2) polymers of dienes; (3) copolymers of conjugated dienes with vinyl substituted aromatic compounds; and (4) star polymers. In this regard, the copolymer selected from (I) polymers of aliphatic olefins having from 2 to about 28 carbon atoms wherein one olefin is ethylene; more particularly, wherein the copolymer is an ethylene-propylene copolymer or ethylene-propylene-diene copolymer having a number average molecular weight from 7,000 to about 60,000.

An also suitable hydrocarbon polymer is an optionally hydrogenated polymer of dienes, wherein the diene is a conjugated diene selected from the group consisting of isoprene, butadiene, and piperylene. Similarly, the hydrocarbon polymer is, a hydrogenated copolymer of a conjugated diene with vinyl substituted aromatic compound wherein the vinyl substituted aromatic compound is a styrenic monomer, more particularly where the diene is selected from the group consisting of isoprene and 1,3-butadiene. A further aspect is wherein the hydrocarbon polymer is a star polymer wherein the arms are derived from dienes and vinyl substituted aromatic compounds.

In one regard, the ethylenically unsaturated carboxylic acid or functional derivative thereof, comprises at least one member of the group consisting of acrylic acid, crotonic acid, methyacrylic acid, maleic acid, maleic anhydride, fumaric acid, itaconic acid and itaconic anhydride, citraconic acid, citraconic anhydride, mesaconic acid, glutaconic acid, chloromaleic acid, aconitic acid, methylcrotonic acid, sorbic acid, and ester of the acids, and combinations of the foregoing. The ethylenically unsaturated carboxylic acid or function derivative is typically grafted onto the hydrocarbon polymer backbone via the ene reaction at reaction temperature or the grafting of the hydrocarbon copolymer is conducted at about 100° C. to about 250° C. in the presence of a free radical initiator. In this regard, the hydrocarbon polymer backbone has been suitably functionalized with a maleic anhydride acylating agent in the range of 0.5 to 10.0 wt % of maleic anhydride based upon the total mass of polymer, more preferably in the range of 0.5 to 3.0 wt % of maleic anhydride based upon the total mass of polymer.

In one aspect, the aryloxy-alkylene amine of the formula Ar—O-Alk-NH$_2$ is selected wherein Ar is an aromatic moiety selected from benzene, naphthylene and anthracene and more preferably naphthylene and anthracene. In another aspect, Ar is a substituted group for example; Ar is an substituted aromatic moiety selected from group consisting of substituted benzene, substituted naphthylene and substituted anthracene, wherein the substituted groups selected from 1 to 3 substituent groups selected from alkyl, alkenyl, alkoxy, aryl, alkaryl, arylalkyl, aryloxy, wherein alkyl is straight or branched-chain carbon having 1 to 6 carbon atoms, wherein alkenyl is straight or branched chain carbon atoms having 2 to 6 carbon atoms. In a more refined aspect, Ar has a single substituent group selected from aryl, alkaryl, arylalkyl, and aryloxy. Ar may also be an aromatic moiety containing at least two aromatic groups either fused or linked by a carbon to carbon bond, alkylene linkage, ether linkage, ester linkage, or keto linkage. In all aspects of above the Alk is CH$_2$CH(R$_o$)— wherein R$_o$ is selected from the group consisting of hydrogen, a straight or branched chain alkyl group having 1 to 6 carbon atoms, aryl and arylalkyl. In one aspect, Alk is selected from the group —CH$_2$CH$_2$—, —CH$_2$CH(CH$_3$)—, —CH$_2$CH$_2$CH$_2$—, and —CH$_2$CH(CH$_3$)CH$_2$—.

One embodiment is directed to an additive concentrate comprising an inert liquid organic diluent and from about 3 to about 95 weight percent based upon to total weight of the additive of lubricating oil additive composition prepared by the process which comprises reacting: (a) a hydrocarbon polymer having a number average molecular weight (M$_n$) between about 7,000 and about 500,000 wherein the polymer backbone has been functionalized with an ethylenically unsaturated acylating agent; and (b) an aryloxy-alkylene amine of the formula Ar—O-Alk-NH$_2$ wherein Ar is an aromatic moiety selected from benzene, naphthylene or anthracene or optionally substituted benzene, optionally substituted naphthylene or optionally substituted anthracene, wherein the optionally substituted groups are selected from 1 to 0.3 substituent groups selected from alkyl, alkoxy, aryl, alkaryl, arylalkyl, aryloxy, wherein-alkyl is straight or branched chain carbon having 6 carbon atoms or less; and -Alk- comprises straight and branched chain alkylene groups having 1 to 10 carbon atoms, which may optionally be substituted with a group consisting of phenyl and benzyl.

Suitable organic diluent are known in the art with a particularly suitable diluent being a diluent oil more preferably selected from a Group II, Group III or Group IV base oil or a mixture thereof, or a mixture of a Group I base oil and at least one Group II, Group II or Group IV base oil.

A further aspect is directed to a lubricating oil composition comprising a major amount of an oil of lubricating viscosity and a minor amount of the oil soluble lubricating oil additive of additive concentrate cited in the paragraph above or the substantially neat oil-soluble lubricating oil additive composition as recited above. When directed to a finished lubricating oil it may further comprising at least one additive selected from the group consisting of antioxidants, antiwear agents, detergents, dispersants, friction modifiers, corrosion and rust inhibitors, viscosity index improvers and anti-foam agents. Thus, compositions may be custom tailor based upon the application.

DETAILED DESCRIPTION

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon-character of the group. Such substituents may include halo-, alkoxy-, nitro-, etc. These grottos also may contain heteroatoms. Suitable hetero atoms will be apparent to those skilled in the art and include, for example, sulfur, nitrogen and oxygen. Therefore, while remaining predominantly hydrocarbon in character within the context of this invention, these groups may contain atoms other than, carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

It must be noted that as used in this specification and appended claims, the singular forms also include the plural unless the context clearly dictates otherwise. Thus the singular forms "a", "an", and "the" include the plural; for example "an amine" includes mixtures of amines of the same type. As another example the singular form "amine" is intended to include both singular and plural unless the context clearly indicates otherwise.

Hydrocarbon Polymer as used herein, the expression 'polymer' refers to polymers of all types, i.e., homopolymers and copolymers. The term homopolymer refers to polymers derived from essentially one monomeric species; copolymers are defined herein as being derived from 2 or more monomeric species.

The hydrocarbon polymer is an essentially hydrocarbon based polymer, usually one having a number average molecular weight ($M_n$) between about 7,000 and about 500,000, often from about 20,000 to about 200,000, frequently from about 30,000 to about 100,000. Molecular weights of the hydrocarbon polymer are determined using well known methods described in the literature. Examples of procedures for determining the molecular weights are gel permeation chromatography (GPC) (also known assize-exclusion chromatography) and vapor phase osmometry (VPO). It is understood that these are average molecular weights. GPC molecular weights are typically accurate within about 5-10%. Even with narrow polydispersity, a polymer with $M_n$ of about 20,000 may have some species as low as about 15,000. A polymer with $M_n$ about 35,000 and $M_n$ about 20,000 may have GPC peaks corresponding to polymer components as low as about 10,000 and as high as 75,000.

These and other procedures are described in numerous publications including: P. J. Flory, "Principles of Polymer Chemistry", Cornell University Press (1953), Chapter VII, pp. 266-316, "Macromolecules, an Introduction to Polymer Science", F. A. Bovey and F. H. Winslow, Editors, Academic Press (1979), pp. 296-312, and W. W. Yau, J. J. Kirkland and D. D. Bly, "Modem Size Exclusion Liquid Chromatography", John Wiley and Sons, New York, 1979.

Unless otherwise indicated, GPC molecular weights referred to herein are polystyrene equivalent weights, i.e., are molecular weights determined employing polystyrene standards.

A measurement which is complementary to a polymer's molecular weight is the melt index (ASTM D-1238). Polymers of high melt index generally have low molecular weight, and vice versa. The polymers of the present invention preferably have a melt index of up to 100 dg/min., more preferably 5 to 15 dg/min when measured using ASTM D1238 condition L at 230° C. and 2.16 kg load.

When the molecular weight of a polymer is greater than desired, it may be reduced by techniques known in the art. Such techniques include mechanical shearing of the polymer employing masticators, ball mills, roll mills, extruders and the like. Oxidative or thermal shearing or degrading techniques are also useful and are known. Details of numerous procedures for shearing polymers are given in U.S. Pat. No. 5,348,673. Reducing molecular weight also tends to improve the subsequent shear stability of the polymer.

In preferred embodiments, the hydrocarbon polymer is at least one oil soluble or dispersible homopolymer or copolymer selected from the group consisting of: (1) polymers of aliphatic olefins having from 2 to about 28 carbon atoms; (2) polymers of dienes; (3) copolymers of conjugated dienes with vinyl substituted aromatic compounds; and (4) star polymers.

These preferred polymers are described in greater detail herein below.

(1) Polymers of Aliphatic Olefins

The hydrocarbon polymer may be one which in its main chain is composed essentially of aliphatic olefin, especially alpha olefin, monomers. The polyolefins of this embodiment thus exclude polymers which have a large component of other types of monomers copolymerized in the main polymer, such as ester monomers, acid monomers, and the like. The polyolefin may contain impurity amounts of such materials, e.g., less than 5% by weight, more often less than 1% by weight, preferably, less than 0.1% by weight of other monomers. Useful polymers include oil soluble or dispersible copolymers of ethylene and $C_3$ to $C_{28}$ alpha-olefins.

The olefin copolymer preferably has a number average molecular weight ($M_n$) determined by gel-permeation chromatography employing polystyrene standards, ranging from about 7,000 to about 500,000, often from about 20,000 to about 300,000, often to about 200,000, more often from about 30,000 to about 100,000, even more often from about 30,000 to about 50,000. Exemplary polydispersity values ($M_w/M_n$) range from about 1.5 to about 10, often to about 3.0, preferably, from about 1.7, often from about 2.0, to about 2.5.

These polymers may be homopolymers or copolymers and are preferably polymers of alpha-olefins having from 2 to about 28 carbon atoms. Preferably they are copolymers, more preferably copolymers of ethylene and at least one other alpha-olefin having from 3 to about 28 carbon atoms, i.e., one of the formula $CH_2=CHR_a$ wherein $R_a$ is straight chain or branched chain alkyl radical comprising 1 to 26 carbon atoms. Preferably $R_a$ is alkyl of from 1 to 8 carbon atoms, and more preferably is alkyl of from 1 to 2 carbon atoms. Examples include homopolymers from monoolefins such as propylene, 1-butene, isobutene, 1-pentene, 1-hexene, 4-methyl-1-pentene, 1-heptene, 1-octene, 1-nonene, 1-decene, etc and copolymers, preferably of ethylene with one or more of these monomers. Preferably, the polymer of olefins is an ethylene-propylene copolymer another preferred olefin copolymer is an ethylene-1-butene copolymer.

The ethylene content of the copolymer is preferably in the range of 10 to 80 percent by weight, and more preferably 40 to 75 percent by weight. When propylene and/or 1-butene are employed as comonomer(s) with ethylene, the ethylene content of such copolymers most preferably is 45 to 65 percent, more preferably in the range of 45 to 52 percent by weight although higher or lower ethylene contents may be present. Most preferably, these polymers are substantially free of ethylene homopolymer, although they may exhibit a degree of crystallinity due to the presence of small crystalline polyethylene segments within their microstructure. The polymer can be a blend of two or more homopolymers of different ethylene content in the range of 10 to 80 percent by weight. Such polymer blends can be made by mixing two or more polymers in a mixing device such as extruder; or by making the each polymers in series reactors, where each reactor makes a homopolymer or copolymer.

In one particular embodiment, the polymer is a homopolymer derived from a butene, particularly, isobutylene. Especially preferred is where the polymer comprises terminal vinylidene olefinic double bonds.

Copolymers herein can include without limitation blends or reacted products of ethylene and one or more $C_3$ to $C_{28}$ alpha-olefins, and additionally optionally other dienes or polyenes and thus may herein also include terpolymers, and other higher forms. Other alpha-olefins suitable in place of propylene to form the copolymer or to be used in combination with ethylene and propylene to form a terpolymer include 1-butene, 1-pentene, 1-hexene, 1-octene and styrene; alpha-omega-diolefins such as 1,5-hexadiene, 1,6-heptadiene, 1,7-octadiene; branched chain alpha-olefins such as 4-methyl-butene-1,5-methylpentene-1 and 6-methylheptene-1; vinyl substituted aromatic compounds such as styrene; and mixtures thereof. Methods for making the polymer substrate are also described, e.g., in U.S. Pat. Nos. 4,863,623, 5,075,383, and 6,107,257, which descriptions are incorporated herein by reference.

More complex polymer substrates, often designated as interpolymers, also may be used as the olefin polymer starting material, which may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, vinylnorbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the disclosure are 1-isopropylidene,-3α,4,7,7α-tetrahydroindene, 1-isopropylidenedicyclopentadiene, dihydro-isodicyclopentadiene, and 2-(2-methylene-4-methyl-3-pentenyl)[2.2.1]bicyclo-5-heptene.

The polymerization reaction used to form an ethylene olefin copolymer substrate can generally be carried out in the presence of a catalyst system capable to polymerizing ethylene and other higher alpha-olefin and optionally a three or more monomers into the polymer or interpolymers described above. The typical catalyst system used in such polymerizations are Ziegler-Natta or metallocene or other known catalyst systems such as dual catalyst system or chain shuttling catalyst. The Ziegler-Natta catalysts include many mixtures of halides of transition metals, especially titanium, chromium, vanadium, and zirconium, with organic derivatives of non-transition metals, particularly alkyl aluminum compounds. The terms "metallocene" and "metallocene catalyst precursor," as used herein, refer to compounds possessing a transition metal M, with cyclopentadienyl (Cp) ligands, at least one non-cyclopentadienyl-derived ligand X (e.g., a leaving group), and zero or one heteroatom-containing ligand Y, the ligands being coordinated to M and corresponding in number to the valence thereof. The metallocene catalyst precursors are generally neutral complexes but when activated with a suitable co-catalyst yield an active metallocene catalyst, which refers generally to an organometallic complex with a vacant coordination site that can coordinate, insert, and polymerize olefins. The metallocene catalyst precursor is preferably one of, or a mixture of metallocene, compounds. Examples of the dual catalyst systems and chain shuttling catalyst can be found in at U.S. Pat. Nos. 7,999,039, 6,875,816 and 6,942,342, which hereby are incorporated as reference.

The polymerization reaction to form the polymer is generally carried out in the presence of a catalyst in a solvent medium. The polymerization solvent may be any suitable inert organic solvent that is liquid under reaction conditions for solution polymerization of monoolefins which is generally conducted in the presence of a Ziegler-Natta or metallocene type catalyst. Examples of satisfactory hydrocarbon solvents include straight chain paraffin's having from about 5 to about 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight-chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

The polymerization medium is not specific and can include solution, slurry, emulsion, or gas phase processes, as known to those skilled in the art. When solution polymerization is employed, the solvent may be any suitable inert hydrocarbon solvent that is liquid under reaction conditions for polymerization of alpha-olefins; examples of satisfactory hydrocarbon solvents include straight chain paraffin's having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

The polymers can be random copolymers, block copolymers, and random block copolymers. Ethylene propylene copolymers are usually random or statistical copolymers. Random or statistical copolymers can be a mixture of two or more polymers made in two or more reactors in series. Block copolymers may be obtained by conducting the reaction in a tubular reactor. Such a procedure is described in U.S. Pat. No. 4,804,794 which is hereby incorporated by reference for relevant disclosures in this regard. These polymers are available commercially as PARATONE® 8941 and PARATONE® 8910 (marketed by Chevron Oronite Company L.L.C.). Block copolymers can also be obtained by selecting appropriate catalyst and/or process for the polymerization. Such polymers are described in U.S. Pat. Application No. 20060199896 which is hereby incorporated by reference for relevant disclosures in this regard. Such Olefin block copolymers are sold commercially by Dow Chemical's under trade name INFUSE™ olefin block copolymers.

Numerous United States patents, including the following, describe the preparation of copolymers of alpha olefins. Copolymers of ethylene with higher alpha olefins are the most common copolymers of aliphatic olefins. Ethylene-propylene copolymers are the most common ethylene-alpha-olefin copolymers and are preferred for use in this invention. A description of an ethylene-propylene copolymer appears in U.S. Pat. No. 4,137,185 which is hereby incorporated herein by reference.

Useful ethylene-alpha olefin, usually ethylene-propylene, copolymers are commercially available. Ethylene-alpha olefin copolymer comprising from about 30 to about 60 weight percent monomer units derived from ethylene are generally referred as low ethylene or amorphous copolymers. Ethylene alpha-olefin copolymer comprising from about 60 to about 80 weight percent units derived from ethylene are generally referred as high ethylene (semi-crystalline) polymers. The polymer substrate can also contain mixtures of amorphous and semi-crystalline polymers in weight ratios as described in U.S. Pat. No. 5,427,702 which hereby is incorporated by reference. The typical polymers available commercially that include amorphous copolymers are PARATONE® 8921 available from Chevron Oronite, LZ7067, LZ7065 and LZ7060 available from the Lubrizol Corporation, Keltan® 1200A, 1200B available from Lanxess and NDR125 available from Dow Chemical Company. The shear stability index (SSI) of the polymer substrate typically range from about 3 to about 60, more typically from about 5 to about 50, more preferably from about 10 to about 25. The thickening efficiency of the useful polymer substrate range from 0.4 to 4.0, more typically from 0.9 to about 3.2.

(2) Polymers of Dienes

The hydrocarbon polymer may be a homopolymer or copolymer of one or more dienes. The dienes may be conjugated such as isoprene, butadiene and piperylene or non-conjugated such as 1-4 hexadiene, ethylidene norbornene, vinyl norbornene, 4-vinyl cyclohexene, and dicyclopentadiene. Polymers of conjugated dienes are preferred. Such polymers are conveniently prepared via free radical and anionic polymerization techniques. Emulsion techniques are commonly employed for free radical polymerization.

As noted hereinabove, useful polymers have $M_n$ ranging from about 7,000 to about 500,000. More often, useful polymers of this type have $M_n$ ranging from about 20,000 to about 100,000.

These polymers may be and often are hydrogenated (optionally hydrogenated) to reduce the amount of olefinic unsaturation present in the polymer. They may or may not be exhaustively hydrogenated. Hydrogenation is often accomplished employing catalytic, methods. Catalytic techniques employing hydrogen under high pressure and at elevated temperature are well-known to those skilled in the chemical art. Other methods are also useful and are well known to those skilled in the art.

Extensive discussions of diene polymers appear in the "Encyclopedia of Polymer Science and Engineering", Volume 2, pp. 550-586 and Volume 8, pp. 499-532, Wiley-Interscience (1986), which are hereby: expressly incorporated herein by reference for relevant disclosures in this regard.

The polymers include homopolymers and copolymers of conjugated dienes including polymers of hydrocarbyl substituted 1,3-dienes preferably at least one substituent is hydrogen. Normally, the total carbon content of the diene will not exceed 20 carbons. Preferred dienes for preparation of the polymer are piperylene, isoprene, 2,3-dimethyl-1,3-butadiene, chloroprene and 1,3-butadiene. Suitable homopolymers of conjugated dienes are described, and methods for their preparation are given in numerous U.S. patents. As a specific example, U.S. Pat. No. 3,959,161 teaches the preparation of hydrogenated polybutadiene. In another example, upon hydrogenation, 1,4-polyisoprene becomes an alternating copolymer of ethylene and propylene.

Copolymers of conjugated dienes are prepared from two or more conjugated dienes. Useful dienes are the same as those described in the preparation of homopolymers of conjugated dienes hereinabove. For example, U.S. Pat. No. 4,073,737 describes the preparation and hydrogenation of butadiene-isoprene copolymers.

(3) Copolymers of Conjugated Dienes with Vinyl Substituted Aromatic Compounds:

In one embodiment, the hydrocarbon polymer is a copolymer of a vinyl-substituted aromatic compound and a conjugated diene. The vinyl substituted aromatics generally contain from 8 to about 20 carbons, preferably from 8 to 12 carbon atoms and most preferably, 8 or 9 carbon atoms.

Examples of vinyl substituted aromatics include vinyl anthracenes, vinyl naphthalenes and vinyl benzenes (styrenic compounds). Styrenic compounds are preferred, examples being styrene, alpha-methystyrene, ortho-methyl styrene, meta-methyl styrene, para-methyl styrene, para-tertiary-butylstyrene and chlorostyrene, with styrene being preferred.

The conjugated dienes generally have from 4 to about 10 carbon atoms and preferably from 4 to 6 carbon atoms. Example of conjugated dienes include piperylene, 2,3-dimethyl-1,3-butadiene, chloroprene, isoprene and 1,3-butadiene, with isoprene and 1,3-butadiene being particularly preferred. Mixtures of such conjugated dienes are useful.

The vinyl substituted aromatic content of these copolymers is typically in the range of about 15% to about 70% by weight, preferably about 20% to about 40% by weight. The aliphatic conjugated diene content of these copolymers is typically in the range of about 30% to about 85% by weight, preferably about 60% to about 80% by weight.

The polymers, and in particular, styrene-diene copolymers, can be random copolymers or block copolymers, which include regular block copolymers or random block copolymers. Random copolymers are those in which the comonomers are randomly, or nearly randomly, arranged in the polymer chain with no significant blocking of homopolymer of either monomer. Regular block copolymers are those in which a small number of relatively long chains of homopolymer of one type of monomer are alternately joined to a small number of relatively long chains of homopolymer of another type of monomer. Random block copolymers are those in which a larger number of relatively short segments of homopolymer of one type of monomer alternate with relatively short segments of homopolymer of another monomer. Block copolymers, particularly diblock copolymers are preferred. Examples of such polymer substrate is illustrated by U.S. Pat. Nos. 6,162,768; 6,215,033; 6,248,702 and 6,034,184 which is hereby incorporated by reference.

The random, regular block and random block polymers used in this invention may be linear, or they may be partially or highly branched. The relative arrangement of homopolymer segments in a linear regular block or random block polymer is obvious. Differences in structure lie in the number and relative sizes of the homopolymer segments; the arrangement in a linear block polymer of either type is always alternating in homopolymer segments.

Normal or regular block copolymers usually have from 1 to about 5, often 1 to about 3, preferably only from 1 to about 2 relatively large homopolymer blocks of each monomer. The sizes of the blocks are not necessarily the same, but may vary considerably. The only stipulation is that any regular block copolymer comprises relatively few; but relatively large, alternating homopolymer segments.

The copolymers can be prepared by methods well known in the art. Such copolymers usually are prepared by anionic polymerization using Group IA metals in the presence of electron-acceptor aromatics, or preformed organometallics such as sec-butyllithium as polymerization catalysts.

The styrene diene block polymers are usually made by anionic polymerization, using a variety of techniques, and altering reaction conditions to produce the most desirable features in the resulting polymer. In an anionic polymerization, the initiator can be either an organometallic material such as an alkyl lithium, or the anion formed by electron transfer from a Group IA metal to an aromatic material such as naphthalene. A preferred organometallic material is an alkyl lithium such as sec-butyl lithium; the polymerization is initiated by addition of the butyl anion to either the diene monomer or to the styrene.

When an alkyl lithium initiator is used, a homopolymer of one monomer, e.g., styrene, can be selectively prepared, with each polymer molecule having an anionic terminus, and lithium gegenion. The carbanionic terminus remains an active initiation site toward additional monomers. The resulting polymers, when monomer is completely depleted, will usually all be of similar molecular weight and composition, and the polymer product will be "monodisperse" (i.e., the ratio of weight average molecular weight to number average molecular weight is, very nearly 1.0). At this point, addition of 1,3-butadiene, isoprene or other suitable anionically polymerizable monomer to the homopolystyrene-lithium "living" polymer produces a second segment which grows from the terminal anion site to produce a living, di-block polymer having an anionic terminus, with lithium gegenion.

Usually, one monomer or another in a mixture will polymerize faster, leading to a segment that is richer in that monomer, interrupted by occasional incorporation of the other monomer. This can be used to build a type of polymer referred to as a "random block polymer", or "tapered block polymer". When a mixture of two different monomers is anionically polymerized in a non-polar paraffinic solvent, one will initiate selectively, and usually polymerize to produce a relatively short segment of homopolymer. Incorporation of the second monomer is, inevitable, and this produces a short segment of different structure. Incorporation of the first monomer type then produces another short segment of that homopolymer, and the process continues, to give a "random" alternating distribution of relatively short segments of homopolymers, of different lengths. Random block polymers are generally considered to be those comprising more than 5 such blocks. At some point, one monomer will become depleted, favoring incorporation of the other, leading to ever longer blocks of homopolymer, resulting in a "tapered block copolymer." An alternative way of preparing random or tapered block copolymers involves initiation of styrene, and interrupting with periodic, or step, additions of diene monomer. The additions are programmed according to the relative reactivity ratios and rate constants of the styrene and particular diene monomer.

"Promoters" are electron-rich molecules that facilitate anionic initiation and polymerization rates while lessening the relative differences in rates between various monomers. Promoters also influence the way in which diene monomers are incorporated into the block polymer, favoring 1,2-polymerization of dienes over the normal 1,4-cis-addition.

These polymers may have considerable olefinic unsaturation, which may be reduced, if desired. Hydrogenation to reduce the extent of olefinic unsaturation may be carried out to reduce approximately 90-99.1% of the olefinic unsaturation of the initial polymer, such that from about 90 to about 99.9% of the carbon to carbon bonds of the polymer are saturated. In general, it is preferred that these copolymers contain no more than about 10%, preferably no more than 5% and often no more than about 0.5% residual olefinic unsaturation on the basis of the total amount of olefinic double bonds present in the polymer prior to hydrogenation. Unsaturation can be measured by a number of means well known to those of skill in the art, including infrared, nuclear magnetic resonance spectroscopy, bromine number, iodine number, and other means. Aromatic unsaturation is not considered to be olefinic unsaturation within the context of this invention.

Hydrogenation techniques are well known to those of skill in the art. One common method is to contact the copolymers often at superatmospheric pressure in the presence of a metal catalyst such as Colloidal nickel, palladium supported on charcoal, etc. Hydrogenation may be carried out as part of the overall production process, using finely divided or supported, nickel catalyst. Other transition metals may also be used to effect the transformation. Other techniques are known in the art.

Other polymerization techniques such as emulsion polymerization can be used.

Examples of suitable commercially available regular linear diblock copolymers as set forth above include SHELLVIS®-40, and SHELLVIS®-50, both hydrogenated styrene-isoprene block copolymers, manufactured by Shell Chemical. Examples of commercially available random block and tapered block copolymers include the various GLISSOVIS-CAL® styrene-butadiene copolymers manufactured by BASF.

The copolymers preferably have $M_n$ in the range of about 7000 to about 500,000, more preferably from about 20,000 to about 100,000. The weight average molecular weight ($M_w$) for these copolymers is generally in the range of about 10,000 to about 500,000, preferably from about 40,000 to about 200,000.

Copolymers of conjugated dienes with olefins containing aromatic groups, e.g., styrene, methyl styrene, etc. are described in numerous patents, for example, U.S. Pat. No. 3,554,911 describes a random butadiene-styrene copolymer, its preparation and hydrogenation.

(4) Star Polymer

Star polymers are polymers comprising a nucleus and polymeric arms. Common nuclei include polyalkenyl compounds, usually compounds having at least two non-conjugated alkenyl groups, usually groups attached to electron withdrawing groups, e.g., aromatic nuclei. The polymeric arms are often homopolymers and copolymers of dienes, preferably conjugated dienes, especially isoprene, vinyl substituted aromatic compounds such as monoalkenyl arenes, especially styrene, homopolymers of olefins such as butenes, especially isobutene, and mixtures thereof.

Molecular weights (GPC peak) of useful star polymers range from about 20,000; often froth about 50,000 to about 700,000. They frequently have Mn ranging from about 50,000 to about 500,000.

The polymers thus comprise a poly(polyalkenyl coupling agent) nucleus with polymeric arms extending outward therefrom. The star polymers are usually hydrogenated such that at least 80% of the olefinic carbon-carbon bonds are saturated, more often at least 90% and even more preferably, at least 95% are saturated. As noted herein, the polymers contain olefinic unsaturation; accordingly, they are not exhaustively saturated before reaction with the carboxylic reactant.

The polyvinyl compounds making up the nucleus are illustrated by polyalkenyl arenes, e.g., divinyl benzene and poly vinyl aliphatic compounds.

Dienes making up the polymeric arms are illustrated by butadiene, isoprene and the like. Monoalkenyl compounds include, for example, styrene and alkylated derivatives thereof. In one embodiment, the arms are derived from dienes. In another embodiment, the arms are derived from dienes and vinyl substituted aromatic compounds. In yet another embodiment, the arms comprise polyisobutylene groups, often, isobutylene-conjugated diene copolymers. Arms derived from dienes or from dienes and vinyl substituted aromatic compounds are frequently substantially hydrogenated. Star polymers are well known in the art.

Mixtures of two or more hydrocarbon polymers may be used.

Grafting Procedure: Acylating Agents-Graft Monomers

A graft monomer is next grafted onto the polymer backbone of the polymer substrate to form an acylated hydrocarbon polymer backbone intermediate, such as an acylated ethylene-alphaolefin polymer.

Suitable graft monomers, include ethylenically unsaturated carboxylic acid materials, such as unsaturated dicarboxylic acid anhydrides and their corresponding acids. These carboxylic reactants which are suitable for grafting onto the polymers contain at least one ethylenic bond and at least one carboxylic-acid or its anhydride groups or a polar group which is convertible. into said carboxyl groups by oxidation or hydrolysis. The carboxylic reactants are selected from the group consisting of acrylic, methacrylic, cinnamic, crotonic, maleic, fumaric and itaconic reactants or a mixture of two or more of these. In the case of unsaturated ethylene copolymers or terpolymers, itaconic acid or its anhydride is useful due to its reduced tendency to form a cross-linked structure during the free-radical grafting process.

In one aspect, the ethylenically unsaturated acylating agent can be represented by formula (A) and/or formula (B):

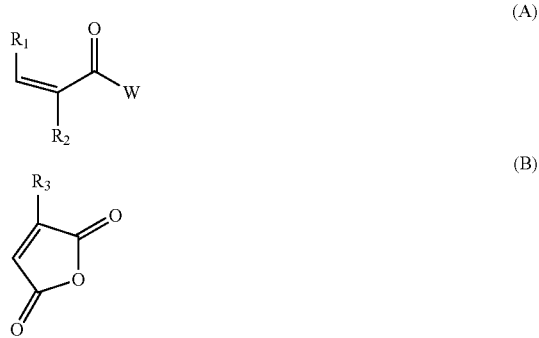

wherein $R_1$ is hydrogen or —CO—W', $R_2$ and $R_3$ are independently hydrogen or $CH_3$; and W and W' are independently —OH, or alkoxyl having 1 to about 24 carbon atoms. Maleic anhydride or a derivative thereof is the preferred ethylenically unsaturated acylating agent.

The ethylenically unsaturated acylating agent may be grafted onto the copolymer backbone in a number of ways. It may be grafted onto the backbone by a thermal process known as the "ene" process or by grafting in solution or in melt form using a free-radical initiator. The free-radical induced grafting of ethylenically unsaturated acylating agents may carried out in solvents, such as hexane, heptane; mineral oil or aromatic solvents, it is carried out at an elevated temperature in the range of about 100° C., to about 250° C., preferably about 120° C. to about 190° C. and more preferably at about 150° C. to about 180° C., e.g. above 160° C., in a solvent preferably a mineral oil solution containing, e.g. about 1 wt % to about 50 wt %, preferably about 5 wt % to about 30 wt %, based on the initial total oil solution, of the polymer and preferably under an inert environment.

The ethylenically unsaturated carboxylic acid materials typically can provide one or two carboxylic groups per mole of reactant to the grafted copolymer. That is, methyl methacrylate can provide, one carboxylic group per molecule to the grafted copolymer while maleic anhydride can provide two carboxylic groups per molecule to the grafted copolymer.

Free-Radical Initiator

The grafting reaction to form the acylated copolymers is in one embodiment generally carried out with the aid of a free-radical initiator either in bulk or in solution. The grafting can be carried out in the presence of a free-radical initiator dissolved in oil. The use of a free-radical initiator dissolved in oil results in a more homogeneous distribution of acylated groups over the olefin copolymer molecules.

The free-radical initiators which may be used to graft the ethylenically unsaturated carboxylic acid material to the polymer backbone include peroxides, hydroperoxides, peresters, and also azo compounds and preferably those which have a boiling point greater than 100 and decompose thermally within the grafting temperature range to provide free radicals. Representatives of these free-radical initiators are peroxides (diacyl peroxides such as benzoyl peroxide, dialkyl peroxides such as 1,1-bis(tert-butylperoxy)cyclohexane. 1,1-bis(tert-butylperoxy)-3,3,5-trimethylcyclohexane, 2,2-bis(tert-butylperoxy)butane, dicumylperoxide, tert-butylcumylperoxide, bis(tert-butylperoxyisopropyl)benzene, di-tert-butylperoxide (DTBP), 2,5-dimethyl-2,5-di(tert-butylperoxy)hexane, 2,5-dimethyl-2,5-di(tert-butylperoxy)-hexyne), hydroperoxides, peroxyesters such as tert-butyl peroxy benzoate, tert-butylperoxy acetate, O,O-tert-butyl-O-(2-ethylhexyl)monoperoxy carbonate, peroxketals such as n-butyl 4,4-di-(tert-butylperoxy)valerate and the like. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having acylating group, typified by a carboxylic acid or acid chloride, within its structure.

Grafting Reaction Equipment and Conditions

To perform the grafting reaction as bulk process, the graft monomer and copolymer are in one embodiment fed to an extruder, e.g., a single or twin screw extruder e.g. Werner & Pfleiderer's ZSK series, or a Banbury or other mixer, having the capability of heating and effecting the desired level of mechanical work (agitation) on the reactants for the grafting step.

In one embodiment, one can conduct grafting in an extruder, such as a twin-screw extruder. A nitrogen blanket is maintained at the feed section of the extruder to minimize the introduction of air. In another embodiment, the olefinic carboxylic acylating agent can be injected at one injection point, or is alternatively injected at two injection points in a zone of the extruder without significant mixing e.g. a transport zone. This results in an improved efficiency of the grafting and leads to a lower gel content.

Suitable extruders are generally known available for conducting grafting, and the prior dehydration procedure. The dehydration of the polymer substrate and subsequent grafting procedures can be performed in separate extruders set up in series. Alternatively, a single extruder having multiple treatment or reaction zones can be used to sequentially conduct the separate operations within one piece of equipment. Illustrations of suitable extruders are set forth, e.g., in U.S. Pat. No. 3,862,265 and U.S. Pat. No. 5,837,773, which descriptions are incorporated herein by reference.

In forming the acylated olefin copolymers, the olefin copolymer generally is fed into processing equipment such as an extruder, intensive mixer or masticator, heated to a temperature of at least 60° C., for example, 150° to 240° C., and the ethylenically unsaturated carboxylic acid reagent and free-radical initiator are separately co-fed to the molten copolymer to effect grafting. The reaction is carried out optionally with mixing conditions to effect grafting of the olefin copolymers. If molecular weight reduction and grafting can be performed simultaneously, illustrative mixing conditions are described in U.S. Pat. No. 5,075,383, which are incorporated herein by reference. The processing equipment is generally purged with nitrogen to prevent oxidation of the copolymer and to aid in venting unreacted reagents and byproducts of the grafting reaction. The residence time in the processing equipment is controlled to provide for the desired degree of acylation and to allow for purification of the acylated copolymer via venting. Mineral or synthetic lubricating oil may optionally be added to the processing equipment after the venting stage to dissolve the acylated copolymer. Other polymer backbones may be processed similarly.

The grafting reaction, can be carried out in solvent-free or essentially solvent free environment. The grafting reaction preferably is performed in the absence of hydrocarbon solvents. The avoidance of hydrocarbon solvents during the grafting reaction, such as alkanes (e.g., hexane), eliminates or significantly reduces the risk and problem of undesired side reactions of such solvents during the grafting reaction which can form undesired grafted alkyl succinic anhydride by-products and impurities. Also, reduced amounts of transient unfunctionalized polymer (ungrafted polymer) are present after grafting in solventless grafting reactions, which results in a more active product. Therefore, the resulting copolymer intermediate is a more active product. A reduction is achieved in levels of undesirable grafted solvent (i.e., grafted hexyl succinic anhydride) and transient unfunctionalized (non-grafted) copolymer.

Hydrocarbon solvents can be omitted according to certain embodiments of the present disclosure include solvents that generally are more volatile than the reactants of the grafting reaction described herein, for example, solvents having a boiling point less than about 150° C. under standard atmospheric pressure conditions (i.e., approximately 14.7 lb./in² absolute). The solvents that can be omitted include, for example, open-chain aliphatic compounds such as $C_9$ or lower alkanes, alkenes and alkynes (e.g., $C_5$ to $C_8$ alkanes such as hexane); aromatic hydrocarbons (e.g., compounds having a benzene nucleus such as benzene and toluene); alicyclic hydrocarbons such as saturated cyclic hydrocarbons (e.g., cyclohexane); ketones; or any combinations of these. In one embodiment, it is desirable to omit all solvents having boiling points approximating or lower than that of nonane under standard atmospheric conditions. Some conventional grafting reactions have been performed in the presence of considerable amounts of hydrocarbon solvent, such as approximately 15% to 60% hexane content. By comparison, in one embodiment of the present disclosure, the total amount of these types of such solvents in the grafting reaction mass does not exceed 0.5 wt. % content thereof.

The grafted copolymer intermediate exits from the die face of the extruder either immediately after grafting, or after shearing and vacuum stripping (discussed below in more detail) if performed in different sections of the same extruder or a separate extruder arranged in series with the extruder in which grafting is conducted.

Selected Properties of Copolymer Intermediate

The resulting copolymer intermediate comprises an acylated copolymer characterized by having carboxylic acid acylating functionality randomly within its structure. The amount of carboxylic acid acylating agent (e.g., maleic anhydride) that is grafted onto the prescribed copolymer backbone (i.e., the copolymer substrate) is important. This parameter is referred to as the mass percentage of acylating, agent on the acylated copolymer and generally is in the range of 0.5 to 3.0 wt. %, particularly in the range of 1.5 to 2.5 wt. %, and more particularly in the range of 1.7 to 2.3 wt. %, of carboxylic acid acylating agent grafted on the copolymer backbone. These numbers are more representative of the amount of carboxylic acid acylating agent being maleic anhydride and may be adjusted to account for agents having higher or lower molecular weights or greater or lesser amounts of acid functionality per molecule.

The wt. % of carboxylic acylating agent incorporated into the backbone can be determined either by infrared peak ratio analysis of acid or anhydride moiety versus copolymer alkyl functionality or by titration (Total Acid/Anhydride Number) (TAN) of the additive reaction product. The TAN value in turn can be used to estimate the degree of grafting of the carboxylic agent.

The carboxylic reactant is grafted onto the prescribed copolymer backbone to provide 0.15 to 0.75 carboxylic groups per 1000 number average molecular weight units (Mn) of the copolymer backbone, preferably 0.2 to 0.5 carboxylic groups per 1000 number average molecular weight. For example, a copolymer substrate with Mn of 20,000 is grafted with 3 to 15 carboxylic groups per copolymer chain or 1.5 to 7.5 moles of maleic anhydride per mole of copolymer. A copolymer with Mn of 100,000 is grafted with 15 to 75 carboxylic groups per copolymer chain or 7.5 to 37.5 moles of maleic anhydride per copolymer chain. The minimum level of functionality is the level needed to achieve the minimum satisfactory dispersancy and/or wear performance.

Molecular Weight Reduction of Copolymer Intermediate

The molecular weight of the acylated copolymer, i.e., the copolymer intermediate, may be reduced by mechanical, thermal, or chemical means, or a combination thereof. Techniques for degrading or reducing the molecular weight of such copolymers are generally known in the art. The number average molecular weight is reduced to suitable level for use in single grade or multigrade lubricating oils. In one embodiment, the initial copolymer intermediate has an initial number average molecular weight ranging from about 1,000 to about 500,000 upon completion of the grafting reaction. In one embodiment, to prepare an additive intended for use in multigrade oils, the copolymer intermediate's number average molecular weight is reduced down to a range of about 1,000 to about 80,000.

Alternatively, grafting and reduction of the high molecular weight copolymer may be done simultaneously. In another alternative, the high molecular weight copolymer may be first reduced to the prescribed molecular weight before grafting. As a representative example, when the olefin copolymer's average molecular weight is reduced before grafting, its number average molecular weight is sufficiently reduced to a value below about 80,000, e.g., in the range of about 1,000 to 80,000.

Reduction of the molecular weight of the copolymer intermediate, or the copolymer feed material during or prior to or after grafting, to a prescribed lower molecular weight typically is conducted in the absence of a solvent or in the presence of a base-oil, using either mechanical, thermal, or chemical means, or combination of these means. Generally, the copolymer intermediate, or copolymer such as olefin copolymer; is heated to a molten condition at a temperature in the range of about 150° C. to about 350° C. and it is then subjected to mechanical shear, thermally or chemical induced cleavage or combination of said means, until the copolymer intermediate (or olefin copolymer) is reduced to the prescribed molecular weight. The shearing may be effected within an extruder section, such as described, e.g., in U.S. Pat. No. 5,837,773, which descriptions are incorporated herein by reference. The molecular weight reduction can be, achieved by treatment of the free radical initiators or hydroperoxide as described, e.g., in U.S. Pat. No. 6,211,332, which descriptions are incorporated herein by reference. The molecular weight reduction can also be achieved, optionally in presence of base oils, in the presence of oxygen at specified temperature as described, e.g., in U.S. Pat. No. 6,362,286, which descriptions are incorporated herein by reference. Alternatively, mechanical shearing may be conducted by forcing the molten copolymer intermediate (or olefin copolymer) through fine orifices under pressure or by other mechanical means.

Vacuum Stripping of Unreacted Ingredients

Upon completion of the grafting reaction, unreacted carboxylic reactant and free radical initiator usually are removed and separated from the copolymer intermediate before further functionalization is performed on the copolymer intermediate. The unreacted components may be eliminated from the reaction mass by vacuum stripping, e.g., the reaction mass may be heated to temperature of about 150° C. to about 300° C. under agitation with a vacuum applied for a period sufficient to remove the volatile unreacted graft monomer and free radical initiator ingredients. Vacuum stripping preferably is performed in an extruder section equipped with venting means.

Pelletization of Copolymer Intermediate

The copolymer intermediate can be optionally pelletized before further processing in accordance with embodiments of the disclosure herein. Pelletization of the copolymer intermediate helps to isolate the intermediate product and reduce contamination thereof until further processing is conducted thereon at a desired time. Alternatively, further reaction to form the final imidized polymer can be done further without pelletizing the intermediate (discussed in more details in section below).

The copolymer intermediate can generally be formed into pellets by a variety of process methods commonly practiced in the art of plastics processing. These include underwater pelletization, ribbon or strand pelletization or conveyor belt cooling. When the strength of the copolymer is inadequate to form into strands, the preferred method is underwater pelletization. Temperatures during pelletization generally may not exceed 30° C. Optionally, a surfactant can be added to the cooling water during pelletization to prevent pellet agglomeration.

The mixture of water and quenched copolymer pellets is conveyed to a dryer such as a centrifugal drier for removal of water. Pellets can be collected in a box or plastic bag at any volume for storage and shipment. Under some conditions of storage and/or shipment at ambient conditions, pellets may tend to agglomerate and stick together. These can be readily ground by mechanical methods to provide high surface area solid pieces for easy and quick dissolution into oil.

Dissolution and Functionalization of Pelletized Copolymer Intermediate

Optionally, the pelletized copolymer intermediate may be supplied as an unground or ground form of the pellets. The pelletized acylated copolymer intermediate is dissolved in solvent neutral oil. The pellets generally are dissolved in the solvent at an introduction level of from about 5 wt. % to about 25 wt. %, particularly about 10 wt. % to about 15 wt. %, and more particularly about 12 wt. % to about 13 wt. % of the copolymer, based on the resulting solution (solute and solvent) viscosity.

The pelletized copolymer intermediate can be dissolved in the solvent neutral at temperature of, for example, about 120° C. to about 165° C. with mechanical stirring under a nitrogen blanket. The dissolving mixture is sparged with inert gas during the dissolution for about 2 to 16 hours. This treatment can be performed in a continuous stirred process vessel of suitable capacity.

The inert sparging gas can be nitrogen. The dissolution and sparging, if used, can be prior to the subsequent amination procedure. One or more spargers are located within the vessel at locations submerged beneath the surface of the solution, preferably near the bottom of the solution, and bubble inert gas through the solution. Nitrogen sparging removes moisture from the dissolved copolymer intermediate and solvent oil. Importantly, the removal of moisture from the copolymer intermediate acts to convert any polymeric dicarboxylic diacids present back to the desired copolymeric dicarboxylic anhydride form.

For instance, where maleic anhydride is used as the grafting monomer, some portion of the pelletized copolymer intermediate may inadvertently transform to a copolymeric succinic diacid form. In, general, this change is more apt to occur as a function of a longer shelf life. The conducting of nitrogen sparging during dissolution of the copolymer intermediate and prior to amination has the benefit of converting the copolymeric succinic diacid back into the desired active polymeric succinic anhydride form before the copolymer intermediate is further reacted and functionalized (e.g., aminated). Consequently, a more highly functionalized and active aminated product can be obtained in subsequent processing. The conversion of polymeric succinic diacid present back into the active polymeric succinic anhydride form can be monitored by measuring the viscosity of the solution. The solution viscosity decreases significantly from an initial higher value down to a steady-state value upon conversion of all or essentially all of the polymeric succinic diacid back into the desired polymeric succinic anhydride form.

Alternate Processes to Prepare the Functionalized Polymer Intermediate

The acylated copolymer can be further reacted with the aryloxy-alkaline amine compounds of this invention in an extruder or mixing devices without being pelletized and/or dissolved in oil. Such process to carry out multi-reaction step in an extruder is described, in more details in U.S. Pat. Nos. 5,424,367; 5,552,096; 5,565,161 which hereby is incorporated by reference. Such process can be carried out in a series extruder systems such as described in U.S. Pat. Application No. 2009247706 which hereby is incorporated by reference. Alternatively, the functionalized polymer can be made using two pass process in an extruder, wherein the first pass produces acylated copolymer intermediate which is fed to an second extruder, optionally connected to the first extruder, as an polymer melt or pellets to carry out further reaction with the aryloxy-alkylene amine of the present invention. This process offers advantages by eliminating the dissolving of the acylated polymer intermediate in an mineral oil to carry out amination reaction.

One more way to carry out the present invention is the form a graft monomer intermediate by first reacting an acylating agent with an aryloxy-alkylene amine of the present invention to form a reaction product. The reaction product may include more than one chemical compound formed from the combination of the acylating agent and the aryloxy-alkylene amine. The formed reaction product is then grafted to the polymer substrate in solution or in the melt process described above. This eliminates the needs to carry out amination reaction on the acylated polymer substrate. Such process is disclosed in U.S. Pat. Nos. 7,371,713; 6,410,652; 6,686,321; 5,523,008; 5,663,126; 6,300,289; 5,814,586; 5,874,389 which hereby are incorporated as reference.

Base Oil

The neutral oil may be selected from Group I base stock, Group II base stock, Group III base stock, Group IV or poly-alpha-olefins (PAO), Group V, or base oil blends thereof. The base stock or base stock blend preferably has a saturate content of at least 65%, more preferably at least 75%; a sulfur content of less than 1%, preferably less than 0.6%, by weight; and a viscosity index of at least 85, preferably at least 100. These base stocks can be defined as follows:

Group I: base stocks containing less than 90% saturates and/or greater than 0.03% sulfur and having a viscosity index greater than or equal to 80 and less than 120 using test methods specified in Table 1 of the American Petroleum Institute (API) publication "Engine Oil Licensing and Certification Sheet" Industry Services Department, 14.sup.th Ed., December 1996, Addendum 1, December 1998;

Group II: base stocks containing greater than or equal to 90% saturates and/or greater than 0.03% sulfur and having a viscosity index greater than or equal to 80 and less than 120 using test methods specified in Table 1 referenced above;

Group III: base stocks which are less than or equal to 0.03% sulfur, greater than or equal to 90% saturates, and greater than or equal to 120 using test methods specified in Table 1 referenced above.

Group IV: base stocks which comprise PAO's.

Group V: base stocks include all other base stocks not included in Group I, II, III, or IV.

For these definitions, saturates level can be determined by ASTM D 2007, the viscosity index can be determined by ASTM D 2270; and sulfur content by any one of ASTM D 2622, ASTM D 4294, ASTM D 4927, or ASTM D 3120.

Aryloxyalkylene Amine

The aryloxy-alkylene amine is suitably an alkylene mono primary amine. By employing only one primary amine function it avoids coupling and/or gelling of copolymers. The alkylene group comprises straight and branched chain alkylene groups having 1 to 10 carbon atoms, with ethylene, propylene, beta substituted ethylene and beta substituted propylene, wherein the substituent groups are lower alkyl selected from 1 to 6 carbon atoms, phenyl and benzyl. The aromatic core moiety is meant to include both mononuclear and polynuclear groups wherein the mononuclear and polynuclear groups may optionally be substituted with one to three substituents. The polynuclear groups can be of the fused type wherein the aromatic nuclear is fused at two points to another nucleus such as found in naphthyl or anthranyl groups. The aromatic may also be the linked type wherein at least two nuclei (either mononuclear or polynuclear) are linked through bridging linkages to each other. These bridging linkages can be chosen from, among others known to those skilled in the art, direct carbon to carbon bonds between the groups without any intervening atoms, alkylene linkages, ether linkages, ester linkages, keto linkages, sulfur linkages and the like. In a preferred aspect, the aromatic group contains at least two aromatic groups either fused or linked. Examples of particularly suited aromatic core groups are derived from benzene, naphthylene and anthracene containing carboxylic groups wherein the aromatic core group is differentiated from an optional substituent. Each of these various aromatic groups may also be substituted by various substituents, including hydrocarbyl substituents.

In a general aspect, the aryloxy-alkylene amine is of the formula Ar—O-Alk-NH$_2$ wherein Ar is an aromatic moiety selected from benzene, naphthylene or anthracene or optionally substituted benzene, optionally substituted naphthylene or optionally substituted anthracene, with the optionally substituted groups selected from 1 to 3 substituent groups selected from alkyl, alkoxy, aryl, alkaryl, arylalkyl, aryloxy, wherein preferably alkyl is straight or branched chain carbon having less than 8 carbon atoms and more preferably alkyl is from $C_1$ to $C_6$. When the substituent group is aryl, alkaryl, arylalkyl, aryloxy the aromatic groups is may be referred to as linked. Particularly preferred aryl groups are phenyl or naphthyl. Preferred arylalkyl groups include the groups in which one hydrogen of the alkyl group is substituted with an aryl group and include, for example benzyl, phenethyl, phenpropyl, napthylmethyl, naphthylethyl, naphthylpropyl. Preferred aryloxy groups include phenoxy and naphthyloxy particularly 1-naphthyloxy and 2-naphthyloxy. The -Alk- group comprises straight and branched chain alkylene groups having 1 to 10 carbon atoms, with ethylene, propylene, beta substituted ethylene and beta substituted propylene, wherein the substituent groups are lower alkyl selected from 1 to 6 carbon atoms, phenyl and benzyl.

The preferred alkylene group comprises straight and branched chain alkylene groups and optionally substituted alkylene having 2 up to 10 carbon atoms, with ethylene, propylene, beta substituted ethylene and beta substituted propylene particularly preferred (in this regard, beta is in reference to the oxygen of Ar—O— group. In one aspect, Alk is —CH$_2$CH(R$_o$)— wherein R$_o$ is selected from the group consisting of hydrogen, a straight or branched chain alkyl from $C_1$ to $C_6$, phenyl or a benzyl group e.g. a phenylmethylene group. In one aspect, -Alk- is —CH$_2$CH(R')CH$_2$— wherein R' is hydrogen or methyl group.

Methods for preparing the aryloxy-alkylene amine compounds are known to those skilled in the art, and such compounds may be prepared by numerous methods such as employed to prepare phenoxyethylamines and polyalkylphenoxyaminoalkanes or as known in the art.

U.S. Pat. No. 5,030,755 discloses a method for producing substituted phenoxyethylamines by reducing a substituted phenoxyacetaldehyde oxime with hydrogen in the presence of a Raney-nickel catalyst.

Polyalkylphenoxyaminoalkanes are known fuel additives useful in the prevention and control of engine deposits. U.S. Pat. No. 5,669,939 describes a process for preparing these compounds which involves initially hydroxylating a polyalkylphenol with an alkylene carbonate in the presence of a Catalytic amount of an alkali metal hydride or hydroxide, or alkali metal salt, to provide a polyalkylphenoxyalkanol which is subsequently reacted with an appropriate amine to provide the desired polyalkylphenoxyaminoalkane. In another aspect, the terminal hydroxy group on the polyalkylphenoxyalkanol may first be converted to a suitable leaving group, such as a mesylate, chloride or bromide, and the like, by reaction with a suitable reagent, such as methanesulfonyl chloride. The resulting polyalkylphenoxyalkyl mesylate or equivalent intermediate may then be converted to a phthalimide derivative by reaction with potassium phthalimide in the presence of a suitable solvent, such as N,N-dimethylformamide. The polyalkylphenoxyalkyl phthalimide derivative is subsequently converted to the desired polyalkylphenoxyaminoalkane by reaction with a suitable amine, such as hydrazine. Alternatively, the leaving group can be converted to an azide, as described, for example, in Turnbull Scriven, Chemical Reviews, Volume 88, pages 297-368, 1988. The azide is subsequently converted to the desired polyalkylphenoxyaminoalkane by reduction with hydrogen and a catalyst, such as palladium on carbon or a Lindlar catalyst.

When the suitable leaving group is a halogen, the polyalkylphenoxyalkanol may be reacted With a suitable halogenating agent, such as HCl, thionyl chloride, or epichlorohydrin, followed by displacement of the chloride with a suitable amine, such as ammonia, a primary or secondary alkyl monoamine, or a polyamine, as described, for example, in U.S. Pat. No. 4,247,301 to Honnen, the disclosure of which is incorporated herein by reference.

Alternatively, the polyalkylphenoxyaminoalkanes may be prepared from the corresponding polyalkylphenoxyalkanol by a process commonly referred to as reductive amination, such as described in U.S. Pat. No. 5,112,364 to Rath et al. and U.S. Pat. No. 4,332,595 to Herbstman et al., the disclosures of which are incorporated herein by reference. In the reductive amination procedure, the polyalkylphenoxyalkanol is aminated with an appropriate amine, preferably ammonia, in the presence of hydrogen and a hydrogenation-dehydrogenation catalyst. The amination reaction is typically carried out at temperatures in the range of about 160° C. to about 250° C. and pressures of about 1,000 to about 5,000 psig, preferably, about 1,500 to about 3,000 psig. Suitable hydrogenation-dehydrogenation catalysts include those containing platinum, palladium, cobalt, nickel, copper, or chromium, or mixtures thereof. Generally, an excess of the ammonia reactant is used, such as about a 5-fold to about 60-fold molar excess, and preferably about a 10-fold to about 40-fold molar excess.

In an another alternative procedure, the polyalkyl phenol can be reacted with an aziridine or a 2-alkyl or 2,3-dialkyl substituted aziridine where alkyl is 1 to 6 carbon atoms. The reaction of aziridines with alcohols to produce beta-amino ethers is well known in the art and is discussed, for example, in Ham and Dernier, "Ethyleneimine and Other Aziridines", Academic Press, New York, 1969, pages 224-227 and 256-257.

U.S. Pat. No. 6,486,352 describes a process of aminoethylation of polyalkylphenol in the presence of a basic catalyst with a β-amino alcohol with a dialkyl carbonate. Suitable β-amino alcohols are of the formula $NH_2—CHR_{10}CH_2—OH$ wherein $R_{10}$ is a lower alkyl having 1 to 6 carbon atoms, phenyl, alkyaryl, or arylalkyl and the dialkyl carbonate is of the formula $(R_{11}O)_2CO$ where $R_{11}$ is lower alkyl having 1 to about 6 carbon atoms. In this regard the β-amino alcohol and the dialkyl carbonate may react to form carbamate intermediates and 2-oxazolidinones which further react. In another aspect α-aminoacids may be employed likewise from β-amino alcohols and/or insitu formation of the 2-oxaxolidinone. Numerous methods are known in the art for example, such reaction may involves a) reduction of the α-aminoacid carboxylic function, b) conversion of the free amino group into carbamate and c) base promoted cyclicization. Alternatively the carboxylic group of the α-aminoacid may be esterified while protecting the amino group to give for example a N-benzyoxycarbamate intermediate which may be reduced lithium borohydride to form the oxazolidinone.

Japanese Patent Publication No. JP 2592732 B2 discloses a method of producing phenoxyethylamines by reacting, under base conditions, low molecular weight phenols and 2-oxazolidinone. German Patent Publication DE 19711004 A1 discloses the use of 2-oxazolidinone to prepare phenoxyaminoalkanes from low molecular weight phenols. 2-4-(Phenoxyphenoxy)ethylamine and ethyl 2-(Phenoxyphenoxy)ethylcarbamate are sequentially prepared in high yield and selectivity by the aminoethylation of 4-phenoxyphenol with 2-oxazolidinone under inert atmosphere, followed by amidation of 2-4-(Phenoxyphenoxy)ethylamine with carbonate derivatives.

U.S. Pat. Nos. 6,384,280 and 6,649,800 disclose a method for producing polyalkylphenoxyaminoalkanes by aminoethylation of a polyalkylphenol compound in the presence of a basic catalyst with a 2-oxazolidinone-preferably in the presence of an alcohol, such as a lower alkyl alcohol.

Examples of suitable oxazolidinone compounds include, but are not limited to, 2-oxazolidinone, 4-methyl-2-oxazolidinone, 4-isopropyl-2-oxazolidinone, 4-phenyl-2-oxazolidinone, and 4-benzyl-2-oxazolidinone. The 2-oxazolidinone compound is preferred. These compounds are readily commercially available and may be purchased for example from Sigma-Aldrich Chemical Company. Alternatively, these compounds may be synthesized by conventional methods apparent to the skilled artisan.

The basic catalyst employed in the process of the present invention will generally be any of the well known basic catalyst selected from the group of alkali metal lower alkoxides, alkali hydrides or alkali metal hydroxides. Typical alkali metal lower alkoxides include, but are not limited to, sodium methoxide, potassium methoxide, sodium ethoxide, potassium ethoxide, sodium propoxide, potassium propoxide, sodium isopropoxide, potassium isopropoxide, sodium butoxide, potassium butoxide. Typically, the alkali metal lower alkoxides will contain 1 to about 6, preferably 1 to about 4, carbon atoms. Preferably, the alkali metal lower alkoxide is sodium methoxide. Sodium hydride and potassium hydride are typical alkali hydrides. Examples of alkali metal hydroxides include, but are not limited, to, sodium hydroxide, lithium hydroxide, or potassium hydroxide. Sodium hydroxide and potassium hydroxide are preferred.

Typically, the reaction temperature for the aminoethylation reaction will be in the range of about 100° C. to 250° C., and preferably in the range of about 130° C. to 210° C. The reaction pressure will generally be atmospheric or lower. Lower pressures may be used to facilitate the removal of carbon dioxide. Other carbon dioxide scavengers may be employed to facilitate the reaction, such as, for example, magnesium oxide or calcium oxide.

When lower alcohols are used, it is advantageous to carry out the reaction under pressure, for example up to 100 psig depending on the alcohol, in order to raise the boiling temperature of the reaction mixture to the optimal level for the reaction. In this case, some means must be provided to remove $CO_2$ so that carbonate salts are not formed in the reactor. This may be accomplished by controlled boiling of the reaction mixture so that solvent vapors carry the $CO_2$ overhead into a column that condenses and recycles the solvent while venting the $CO_2$. Nitrogen sparging into the reaction mixture or purging of the reactor head space may also be used to accomplish the same end while maintaining pressure on the reactor.

The molar ratio of 2-oxazolidinone or a derivative thereof to the aromatic alcohol (phenol) compound is normally in the range of about 5:1 to 0.9:1, and preferably will be in the range of about 2:1 to 1:1. In general, the number of equivalents of the basic catalyst per equivalents of phenol will be in the range of about 0.05:1 to 1:1, and preferably in the range of about 0.1:1 to 1:1.

The aminoethylation reaction may be carried out neat or in the presence of a solvent which is inert to the reaction of the phenol compound and the 2-oxazolidinone or a derivative thereof. An inert solvent is often used to facilitate handling and to promote good contacting of the reactants. When employed, examples of inert solvents include heptane, benzene, toluene, chlorobenzene and 250 thinner which is a mixture of aromatics, paraffin's and naphthenes. Kerosene-type jet fuel is another example of the latter mixture. Other examples of inert solvents that are aromatic mixtures include Exxon Aromatic 100, Exxon Aromatic 150, Solvesso 100, Total Solvarex 9 and the like. Other solvents apparent to those skilled in the art may also be used. For example, any number of ethers, aprotic polar solvents or alcohols may also be useful in the process of the present invention. Particularly suited alcohols are alkylalcohols. Examples of typical alcohols include n-propanol, n-butanol, 1-pentanol, 1-hexanol, 1-heptanol, and mixed isomers of each of the foregoing alcohols including branched- or straight-chain alcohols. 1-Hexanol or hexanol isomers are preferred. Examples of commercial alcohols available from ExxonMobil Chemical that are a mix of several isomers include Exxal 6 (hexyl alcohol) and Exxal 7 (isoheptyl alcohol). When employed, the molar ratio of the alcohol to the phenol compound is normally in the range of about 0.2:1 to 5:1, preferably about 0.4:1 to 2:1, and most preferably about 0.5:1 to 1.5:1.

The aminoethylation reaction will generally be carried out over a period of about 2 to 24 hours, and preferably over a period of about 3 to 20 hours. Upon completion of the reaction, the desired phenoxyaminoalkane is isolated using conventional techniques.

U.S. Pat. No. 5,276,192 discloses a two step process of reacting a suitable phenol with 2-oxazoline to form a phenoxyethyl-acetamide intermediate which is thereafter hydrolyzed, preferably in an aqueous phosphoric acid. Similarly WO 03/0954416 discloses a method a method to produce 2-alkoxyphenoxyethanamine via a two step process by producing a 2-alkoxyphenolyethylacetamide using the reaction of an ortho substituted phenol with a 2-alkyloxazoline followed by hydrolyzation of the acetamide with water in the presence of organic or mineral acid such as hydrochloric acid or sulfuric-acid preferred over phosphoric acid. There are numerous other ways to hydrolyze the amide to the amine known in the art, such as using base catalyzed conditions with KOH, NaOH, Ba(OH)$_2$ which in one aspect is preferred.

In another aspect, the aryloxy-alkyene amine is prepared by cyanoethylation of a hydroxy-aryl moiety followed by hydrogenation and such reactions are known in the art, U.S. Pat. Nos. 2,974,160; 2,421,837; U.S. Pat. App. 2003/0150154 and the like. Commonly an aromatic alcohol is reacted with acrylonitrile in the presence a well-known catalyst at a temperature in the range of about 20° C. to 100° C., and preferably from about 25° C. to 65° C. Typical catalysts include alkali metal hydroxides, alkoxides and hydrides, alkali metal salts, and tetrahydrocarbyl ammonium hydroxides and alkoxides. The amount of base employed will generally range from about 0.001 to 1.0 equivalent, preferably from about 0.01 to 0.1 equivalent. The acrylonitrile employed will generally range from about 1 to 20 equivalents, preferably from about 1 to 10 equivalents. The reaction may take place in the presence or absence of an inert solvent. The time of reaction will vary depending on the particular aromatic alcohol and acrylonitrile reactants, the catalyst used and the reaction temperature. For example 2-naphthol when heated with excess acrylonitrile in the presence of a catalytic amount of Triton B leads to the ether product of β-(2-naphthoxy)propionitrile whereas equimolar in sodium hydroxide yields the carbon-cyanoethylation product, 1-(β-cyanoethyl)-2-naphthol, see K. H. Takemura J. Am. Chem. Soc. 69, vol. 32, 2343 (1947).

The CN group from the cyanoethylation reaction may be reduced by any number of procedures well known in the art to an amino group —CH$_2$NH$_2$ group under catalytic hydrogenation conditions to yield the ArO—CH$_2$CH(R')CH$_2$NH$_2$ compound wherein R' selected from hydrogen or C$_{1-6}$ alkyl, preferably R' is hydrogen or methyl. Typically, this reaction is conducted using a nickel, Raney nickel, cobalt, Raney cobalt, copper-chromite, platinum, palladium, or rhodium catalyst. Preferably, the catalyst is nickel, Raney nickel, or platinum. The hydrogen pressure, time, and temperature depend on the catalyst employed. An inert solvent may be employed such as ethanol, ethyl acetate, and the like. Ammonium may also be added as a diluent. Hydrogenation of CN groups is further discussed, for example, in P. N. Rylander, Catalytic Hydrogenation in Organic Synthesis, Second Edition, pp. 138-152, Academic Press (1979) and H. F. Rase, Handbook of Commercial Catalysts, Heterogeneous Catalyst, pp. 138-148, CRC Press (2000) and references cited therein.

The reaction between the copolymer substrate intermediate having grafted thereon carboxylic acid acylating function and the prescribed aryloxyalkylene amine compound is preferably conducted by heating a solution of the copolymer substrate under inert conditions and then adding the amine compound to the heated solution generally with mixing to effect the reaction. It is convenient to employ an oil solution of the copolymer substrate heated to 120° C. to 175° C., while maintaining the solution under a nitrogen blanket. The amine compound is added to this solution and the reaction is effected under the noted conditions.

The aryloxyalkylene amine functionalized acylated copolymer substrate of the present disclosure can be incorporated into lubricating oil in any convenient way. Thus, the grafted, multi-functional copolymers reaction product can be added directly to the lubricating oil by dispersing or dissolving the same in the lubricating oil at the desired level of concentration. Such blending into the lubricating oil can occur at room temperature or elevated temperatures. Alternatively, the reaction product can be blended with a suitable oil-soluble solvent/diluent (such as benzene, xylene, toluene, lubricating base oils and petroleum distillates) to form a concentrate, and then blending the concentrate with a lubricating oil to obtain the final formulation. Such additive concentrates will typically contain (on an active ingredient (A.I.) basis) from about 3 to about 95 wt. %, and preferably from about 5 to about 35 wt. %, grafted, multi-functional aryloxyalkylene amine copolymer additive, and typically from about 20 to 90 wt %, preferably from about 40 to 60 wt %, preferably from about 10 to 13 wt % base oil based on the concentrate weight.

Lubricating oils containing the aryloxyalkylene amine functionalized acylated copolymer substrate of the present disclosure may be beneficially employed directly, or alternatively as pre-diluted in base oil in concentrate form as typically used for lubricating oil additives. Suitable base oil have been described herein.

Advantageous results are also achieved by employing the additive mixtures of the present disclosure in base oils conventionally employed in and/or adapted for use as crankcase lubricating oil compositions, power transmitting fluids, heavy duty hydraulic fluids, power steering fluids and the like. Gear lubricants, industrial oils, pump oils and other lubricating oil compositions can also benefit from the incorporation therein of the additive mixtures of the present disclosure. These lubricant compositions are particularly suited for use to lubricate internal combustion engines (e.g., heavy duty diesel engines, including types equipped with exhaust gas recirculator (EGR) systems), automotive vehicle transmissions, gears and other mechanical devices and components. Lubricant compositions containing the additive reaction product of certain embodiments of the present disclosure have improved soot dispersing (deagglomeration), deposit control, and boundary film formation performance and wear performance in comparison to standard VI improvers or in the absence of the additive. The improved boundary film formation performance in soot-containing oils aids in protecting against engine wear from the soot. In one aspect, the additive reaction product can be added to lubricating compositions in an amount sufficient to reduce the amount of oil thickening of the lubricating oil due to soot content; especially in exhaust gas recirculation (EGR) equipped diesel engines. In another aspect, the additive reaction product can be added to lubricating compositions in an amount sufficient to reduce the amount to positively influence wear performance of the lubricating oil due in part to soot content, especially in exhaust gas recirculation (EGR) equipped diesel engines. In this regard, one aspect is directed to a method of operating a heavy duty diesel engine optionally provided with a cooled exhaust gas recirculation system comprising lubricating said engine with a lubricating oil composition comprising a major amount of an oil of lubricating viscosity and a minor amount of the amine functionalized acylated copolymer substrate of the present disclosure.

These lubricating oil formulations conventionally contain additional additives that will supply the characteristics that are required in the formulations. Among these types of additives are included additional viscosity index improvers, antioxidants, corrosion inhibitors, detergents, dispersants, pour point depressants, antiwear agents, antifoaming agents, demulsifiers and friction modifiers.

In the preparation of lubricating oil formulations it is common practice to introduce the additives in the form of 10 to 80 wt. % active ingredient concentrates in hydrocarbon oil, e.g. mineral lubricating oil, or other suitable solvent.

Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the grafted, multi-functional olefin aryloxyalkylene amine copolymer would usually be employed in the form of a 10 to 50 wt. % concentrate, for example, in a lubricating oil fraction. In one embodiment, the amount of the grafted, multi-functional olefin aryloxyalkylene amine copolymer dispersant viscosity improver in a finished lubricating oil is from about 0.2 weight percent to about 18 weight percent, and particularly about 1 weight percent to about 2.5 weight percent.

The following examples are presented to illustrate specific embodiments of this invention and are not to be construed in any way as limiting the scope of the invention. Unless indicated otherwise, all parts are parts by weight, temperatures are in degrees Celsius, and pressures in millimeters mercury (mm Hg). Any filtrations are conducted using a diatomaceous earth filter aid. Analytical values are obtained by actual analysis.

Polymer Analyses

The ethylene contents as an ethylene weight percent ($C_2$ wt %) for the ethylene-based copolymers are typically determined according to ASTM D3900.

The number average molecular weight of the polymers were determined using Gel Permeation Chromatography (GPC) using trichlorobenzene (TCB) as solvent at 145° C. using a triple detection method with polystyrene calibrations.

Thickening efficiency (TE) is a measure of the thickening ability of the polymer in oil, and is defined as: $TE=2/c \times \ln((kv_{(polymer+oil)})/kv_{oil})/\ln(2)$, where c is the concentration of the polymer and kv is kinematic viscosity at 100° C. according to ASTM D445. The shear stability index (SSI) is an indication of the resistance of polymers to permanent mechanical shear degradation in an engine. The SSI can be determined by passing a polymer-oil solution for 30 cycles through a high shear Bosch diesel injector according to the procedures listed in ASTM D6278. The SSI of a polymer can be calculated from the viscosity of the oil without polymer and the initial and sheared viscosities of the polymer-oil solution using:

$$SSI=100 \times kv_{(polymer+oil),fresh} - kV_{(polymer+oil),sheared)}/ kV_{(polymer+oil),fresh} - kV_{oil,fresh})$$

EXAMPLES

Examples 1-6

Preparation of Acylated Ethylene-Alpha Olefin Copolymer

The acylated ethylene-alpha olefin copolymers ("OCP") were prepared by grafting maleic anhydride using peroxide initiator in a counter rotating twin screw extruder on to various ethylene-propylene backbones as listed in Table 1, Examples 1-3.

Acylated ethylene-alpha olefin copolymer in Example 1 was prepared in a laboratory twin screw counter rotating extruder (Prism TSE 16TC Bench top extruder). The ethylene-propylene starting polymer used in the study was granulated PARATONE® 8921. PARATONE® 8921 is a random ethylene-propylene copolymer with 49 wt %. ethylene content produced by Ziegler-Natta polymerization with number average molecular weight 56,575 kD as measured by GPC using trichlorobenzene at 145° C. as solvent and triple-detection method using polystyrene standards. PARATONE® 8921 has thickening efficiency and SSI of 2.7 and 50, respectively. The maleic anhydride grafted polymer was prepared under the following conditions: granulated PARATONE® 8921, 5 wt % maleic anhydride, 0.625 wt % di-tertiary butyl peroxide dissolved in 1 wt % poly-alpha olefin (PAO) having kinematic viscosity at 100° C. of 4 cSt were pre-mixed in an extruder at around 60 C to obtain pre-mixed pellets. The mixture was then fed to co-rotating twin-screw extruder operating at screw speed of 100 rpm and following temperature profile along the extruder: 100° C., 140° C., 225° C., 225° C. Excess reagents were removed with vacuum stripping prior to die and the extruded polymer was recovered. The maleic anhydride content was determined by FTIR and by titration with tetra-butyl ammonium hydroxide (TBAH). The maleic anhydride content using TBAH titration, thickening efficiency, SSI and molecular weight are listed in Table 1. Examples 2 and 3 were prepared in a pilot scale twin-screw extruder by grafting PARATONE®0.8921 with maleic anhydride in presence of an peroxide. The reaction conditions and molar proportions of maleic anhydride, peroxide initiator, and ethylene-propylene copolymer were controlled to obtain desired maleic anhydride grafting level, SSI, and the number average molecular weight as shown in Table 1. The unreacted maleic anhydride and peroxide decomposition products were removed with vacuum stripping prior to pelletizing the acylated polymers.

Acylated ethylene-alpha olefin copolymer of Example 4 was received from a commercial supplier.

Acylated polybutadiene ("PBD") of Example 5 was received from a commercial supplier.

Acylated polyisoprene ("PIP") in Example 6 was prepared as follows:

To a 1 L glass kettle reactor were added 186.2 g of polyisoprene (39K Mn) and 187.2 of a 100N diluent Oil. The mixture was heated with agitation under a $N_2$ blanket. When the mixture reached 140° C., 4.29 g of solid maleic anhydride was charged to the reactor. Heating and agitation continue under $N_2$ to 200° C., and the reaction was held at these conditions for 3 h. Vacuum was then applied (<50 mmHg) for 40 min to remove any residual maleic anhydride. Titration (ASTM D94) analysis of the product indicated that 1.8 wt % of maleic anhydride was grafted onto the polyisoprene.

Example 12

Synthesis of 2-(2-Naphthyloxy)Ethylamine

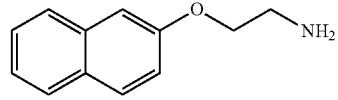

To a 3-neck 250 mL round-bottom flask-equipped with a heating mantle, a stir plate, a PTFE-coated magnetic stir bar, a thermocouple, a nitrogen inlet, a nitrogen outlet, and a reflux condenser was added 2-naphthol (10 g, 69.35 mmol), potassium hydroxide (0.40 g, 6.17 mmol), 2-oxazolidinone (9.06 g, 104.02 mmol), and ExxonMobil™ Aromatic 100 solvent (70 mL). The reaction was heated to reflux temperature (~170° C.) under active nitrogen flow and stirred for 4 hours. TLC and $^1$H NMR were used to monitor the reaction progress. Once the 2-naphthol had completely reacted, the reaction was cooled to room temperature (20-25° C.) and filtered through a glass filter packed with Celite®. The solvent was removed in vacuo to obtain a brown liquid (9.18 g, 72% yield, 88% pure). The crude reaction product could be further purified by flash column chromatography. $^1$H NMR (DMSO-d6, 400 MHz) δ 7.85-7.79 (m, 3H), 7.50-7.44 (m, 1H), 7.38-7.33 (m, 1H), 7.31 (d, 1H, J=2.6 Hz), 7.23 (dd, 1H, J=9.0, 2.6 Hz), 4.04 (dd, 2H, J=5.7, 5.7 Hz), 2.99 (dd, 2H,

TABLE 1

Acylated polymers

| Example (acylated backbone) | Polymer backbone type | Ethylene Content, wt % | $M_n$ of acylated copolymer, kDa | MA content, wt % | Thickening Efficiency (acylated copolymer) | SSI, % (acylated copolymer) | Concentrate (polymer/oil) (wt/wt) |
|---|---|---|---|---|---|---|---|
| 1 | OCP-1 | 49 | 24025 | 2.6 | 2.09 | 37 | 7/93 |
| 2 | OCP-2 | 49 | 51890 | 2.7 | 1.75 | 21 | 10/90 |
| 3 | OCP-3 | 49 | 46150 | 1.6 | 1.73 | 17.9 | 10/90 |
| 4 | OCP-4 | n.m. | 12000$^a$ | 2.0$^a$ | 0.6 | 3 | 50/50 |
| 5 | PBD-1 | N/A | 5300$^a$ | 5.0$^a$ | NA | NA | 50/50 |
| 6 | PIP-1 | N/A | 39,000$^a$ | 1.8 | 0.39 | 3 | 50/50 |

$^a$ = data from manufacturer.

Examples 7-16

Aryloxyalkylene Amines

Many of the aryloxyalkylene amines used in the current invention are commercially available and were purchased from third party suppliers (See Table 2). Those amines that were not readily available in the quantities needed for testing were synthesized using methods as described previously.

TABLE 2

Aryloxyalkylene amines

| Example | Amine/Alcohol | Carbon Length (Alk) | Aromatic Group | Availability |
|---|---|---|---|---|
| 7 | 2-Naphthol | 0 | Naphthyl | Sigma-Aldrich Co. ® |
| 8 | 2-(2-Naphthoxy)ethanol | 2 | Naphthyl | Alfa Aesar ® |
| 9 | 2-methoxyethylamine | 2 | Methyl | Sigma-Aldrich Co. ® |
| 10 | 2-phenoxyethylamine | 2 | Benzyl | Alfa Aesar ® |
| 11 | 3-Phenoxypropylamine | 3 | Benzyl | Chembridge Corporation |
| 12 | 2-(2-naphthyloxy)ethylamine | 2 | Naphthyl | Prepared |
| 13 | 2-(9-anthracenyloxy)ethylamine | 2 | Anthracenyl | Prepared |
| 14 | 2-(4-phenylphenoxy)ethylamine | 2 | Biphenyl | Prepared |
| 15 | 2-(4-phenoxyphenoxy)ethylamine | 2 | Diphenyl Ether | Prepared |
| 16 | 2-(2-nonylphenoxy)ethylamine | 2 | 2-Nonylbenzene | Prepared |

J=5.7, 5.7 Hz), 1.74 (bs, 2H). $^{13}$C NMR (DMSO-d6, 400 MHz): 157.6, 135.3, 130.2, 129.4, 128.4, 127.6, 127.2, 124.4, 119.7, 1107.6, 71.3, 42.0. MS (ESI) for $C_{12}H_{13}NO$ [M+H] calc. 187.24. found 187.66. IR (film): 3364, 3279, 3061, 2940, 2830, 1626, 1597, 1509, 1469, 1456, 1389, 1370, 1357, 1313, 1259, 1216, 1181, 1141, 1118, 1086, 1014.

Alternate Prep Using 2-Methyl-2-Oxazoline:

A 3-neck round bottom flask was charged with 2-methyl-2-oxazoline (5.9 mL, 69.4 mmol) followed by 2-naphthol (10.0 g, 69.4 mmol) at room temperature. The resulting mixture was heated to reflux and stirred for 6 h. Reaction was monitored by TLC analysis. Additional 2-methyl-2-oxazoline (2.5 mL, 29.4 mmol) was added to ensure complete conversion of the 2-naphthol and the reaction mixture was heated to reflux for 16 additional hours. The reaction mixture was cooled to 70° C. then poured into ethyl acetate (100 mL) and stirred for 15 min. The resulting slurry was filtered and washed with ethyl acetate (25 mL). The filter cake was further dried under vacuum to afford -(2-(naphthalen-2-yloxy)ethyl) acetamide as an off white solid (12.35 g, 77.7% yield). $^1$H NMR (DMSO-d6, 400 MHz) δ 8.179-8.126 (m, 1H), 8.84-7.79 (m, 3H), 7.7.48-7.43 (m, 1H), 7.37-7.32 (m, 2H), 7.18 (dd, j=2.59 Hz, 8.97 Hz, 1H) 4.11 (t, j=5.66, 2H), 3.48 (q, j=5.90 Hz, 2H), 1.85 (s, 3H).

A 3-neck round bottom flask was charged with water (50 mL) and barium hydroxide (12.27 g, 71.61 mmol) while stirring. The resulting slurry was charged with ethanol (50 mL) and finally N-(2-(naphthalen-2-yloxy)ethyl)acetamide (10.0 g, 35.80 mmol) as prepared above. The resulting mixture was heated to reflux for 18 h. The reaction was monitored by TLC. The reaction was then allowed to cool to 50° C., then charged with water (50 mL) followed by ethyl acetate (100 mL). The mixture was then stirred for 15 min. The mixture was then filtered and thelayers were separated. The upper organic layer was washed with saturated sodium chloride (50 mL) and dried over sodium sulfate and concentrate to afford 2-(2-naphthyloxy)ethylamine as an amber oil (6.92 g, 47%).

Example 13

Synthesis of 2-(9-Anthracenyloxy)Ethylamine

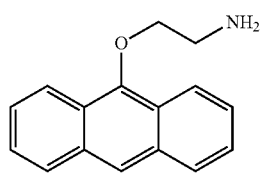 [SMILES: NCCOc1c2ccccc2cc2ccccc12]

ExxonMobil™ Aromatic 100 solvent vvas added into a 3-neck round bottom flask containing anthrone (10 g, 51.5 mmol) at room temperature. Potassium hydroxide pellets (0.33 g, 5.15 mmol) and 2-oxazolidinone (7.62 g, 87.5 mmol) were added, and the reaction mixture was heated to reflux and stirred for 2.5 h under nitrogen. The reaction mixture was cooled to room temperature, decanted, and filtered. The solvent was evaporated in vacuo to give 4.3 g (35%) of the desired amine. The crude reaction mixture could be further purified by flash column chromatography. $^1$H NMR (DMSO-d6, 400 MHz) δ 8.38-8.31 (m, 3H), 8.08-8.02 (m, 2H), 7.56-7.47 (m, 4H), 4.13 (dd, 2H, J=5.58, 5.58 Hz), 3.15 (dd, 2H, J=5.60, 5.60 Hz), 2.91 (bs, 2H). $^{13}$C NMR (DMSO-d6, 400 MHz) δ 150.7, 132.8, 128.4, 125.6, 125.4, 124.1, 122.1, 121.9, 78.2, 42.1.

Example 14

Synthesis of 2-(4-Phenylphenoxy)Ethylamine

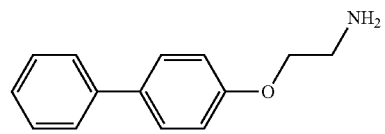

ExxonMobil™ Aromatic 100 solvent (300 mL) was added into a 3-neck round bottom flask containing 4-phenylphenol (50.00 g, 294 mmol) and stirred for 15 minutes at room temperature. Potassium hydroxide pellets (1.9 g, 293 mmol) were added and the mixture heated to reflux temperature for 10 minutes. 2-oxazolidinone (26.5 g, 294 mmol) was added, and the reaction mixture continued to stir at reflux temperature for 4 hours. Additional 2-oxazolidinone (8.05 g, 92.4 mmol) was added and the reaction mixture was allowed to continue stirring at reflux for an additional 4 hours. After indication of complete conversion of 4-phenylphenol by TLC, the reaction mixture was allowed to cool to room temperature. The crude reaction mixture was filtered and the filtrate was collected. The solvent was evaporated in vacuo to obtain 14.5 g (23%) of the amine as a white solid. $^1$H NMR (DMSO, 400 MHz) δ 7.63-7.55 (m, 4H), 7.45-7.40 (m, 2H), 7.34-7.28 (m, 1H), 7.05-7.00 (m, 2H), 3.95 (dd, 2H, J=5.8, 5.8 Hz), 2.89 (dd, 2H, J=5.8, 5.8 Hz). $^{13}$C NMR (DMSO, 400 MHz) δ 158.3, 139.8, 132.4, 128.8, 127.7, 126.6, 126.1, 1 f4.9, 70.3, 41.0. MS (ESI) for $C_{14}H_{15}NO$ [M+H] calc. 213.28. found 213.96.

Example 15

Synthesis of 2-(4-Phenoxyphenoxy)Ethylamine

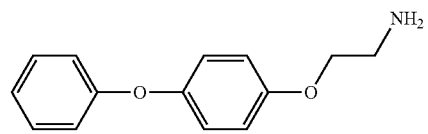

Mesitylene (24 mL) was added into a round bottom flask containing 4-phenoxyphenol (5.00 g, 26.85 mmol). Potassium methoxide (25% in methanol) (0.79 mL, 2.685 mmol) was added and stirred for 15 minutes. 2-oxazolidinone (2.34 g, 26.85 mmol) was then added, and the reaction mixture was heated to reflux temperature and stirred for 16 h. After cooling the reaction mixture to room temperature, the reaction mixture was filtered over Celite® and the solvent evaporated under reduced pressure. The crude reaction product was isolated by flash column chromatography to yield 2.75 g (45%) of the amine. $^1$H NMR (MeOD, 400 MHz) δ 8.21-8.11 (m, 2H), 8.35-7.91 (m, 1H), 7.83-7.67 (m, 6H), 7.02-6.96 (m, 2H), 4.71 (dd, 2H, J=5.9, 5.9 Hz), 3.68 (dd, 2H, J=5.8, 5.8 Hz).

Example 16

Synthesis of 2-(2-Nonylphenoxy)Ethylamine

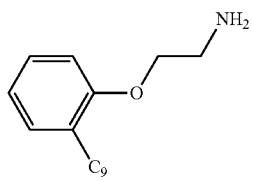

To a 250 mL round bottom flask equipped with a thermocouple, heating mantle, nitrogen inlet/outlet, a condenser and a stir bar was added 2-oxazolidinone (6.72 g, 77.2 mmole), 2-nonylphenol (10.0 g, 45.4 mmole), potassium hydroxide (255 mg, 4.5 mmole) and ExxonMobil™ Aromatic 100 solvent (70 mL). The resulting mixture was heated to reflux temperature for 3 h. Reaction progress was monitored by TLC and $^1$H NMR. The reaction mixture was then cooled, filtered over Celite® and the solvent were evaporated under reduced pressure. The crude material was purified using flash column chromatography to give the amine. $^1$H NMR (DMSO-d6, 400 MHz) δ 7.26-7.12 (m, 2H), 6.88-6.81 (m, 2H), 3.87 (dd. 2H, J=5.8, 5.8 Hz), 2.86 (dd, 2H, J=5.8, 5.8 Hz), 1.75-0.42 (m, 19H).

Examples 17-31

Reaction of Acylated Olefin Copolymers 1-6 with Aryloxyalkylene Amines 7-16

General Procedure for the preparation of functionalized polymers: A sample of acylated polymer was dissolved in base oil to form a concentrate as indicated in Table 1. The concentrate (~2900 g) was added to a 4 L kettle reactor at room temperature. The aryloxyalkylene amine (1.0 equivalent relative to maleic anhydride) was subsequently added at room temperature. The reaction mixture was then heated to 150° C. and stirred under an active flow of nitrogen for 3 hours. The reaction product was cooled to room temperature. Conversion of acylated polymer to the desired product was confirmed by FTIR analysis.

The acylated backbones as listed in Table 1 were reacted with the aryloxyalkylene amines listed in Table 2 as shown in Examples 17 to 21 (Table 3). Several comparative examples were synthesized to illustrate the present invention. Example 17 was an attempt to react 2-naphthol itself with the maleated OCP, however, no reaction was observed under the standard reaction conditions. Example 18 is the reaction product of the acylated polymer and 2-(2-naphthoxy)ethanol designed to explore the benefit of the amine functionality. Example 19 is the reaction product of 2-methoxyethylamine and the acylated polymer. This example was prepared to illustrate the importance of the aromatic functionality. Examples 20 and 21 directly compare the ethylene and propylene linker groups. Examples 20, 22, and 3 were designed to explore the effect of fused aromatic rings. Examples 24-26 explore various substitution on the aromatic ring. Examples 27-31 were synthesized to illustrate the role of the polymer backbone.

TABLE 3

Synthesis of functionalized polymers 17-31

| Example | Acylated Polymer | Amine | IR analysis |
|---|---|---|---|
| 17 | OCP-1 | 2-Naphthol | No product |
| 18 | OCP-1 | 2-(2-Naphthoxy)ethanol | Ester |
| 19 | OCP-1 | 2-methoxyethylamine | Imide |
| 20 | OCP-1 | 2-phenoxyethylamine | Imide |
| 21 | OCP-1 | 3-phenoxypropylamine | Imide |
| 22 | OCP-1 | 2-(2-naphthyloxy)ethylamine | Imide |
| 23 | OCP-1 | 2-(9-anthracenyloxy)ethylamine | Imide |
| 24 | OCP-1 | 2-(4-phenylphenoxy)ethylamine | Imide |
| 25 | OCP-1 | 2-(4-phenoxyphenoxy)ethylamine | Imide |
| 26 | OCP-1 | 2-(2-nonylphenoxy)ethylamine | Imide |
| 27 | OCP-2 | 2-(2-naphthyloxy)ethylamine | Imide |
| 28 | OCP-3 | 2-(2-naphthyloxy)ethylamine | Imide |
| 29 | OCP-4 | 2-(2-naphthyloxy)ethylamine | Imide |
| 30 | PBD-1 | 2-(2-naphthyloxy)ethylamine | Imide |
| 31 | PIP-1 | 2-(2-naphthyloxy)ethylamine | Imide |

Examples 32 to 46

HFRR Wear Performance

Examples 32 to 46, which exemplify the lubricating oil additive composition of the present invention, were evaluated for High Frequency Reciprocating Rig (HFRR) wear bench test in presence of a soot surrogate. The HFRR bench test measures the average wear scar diameter on the ball specimen after subjecting it to a reciprocating sliding motion at specified load in presence of lubricant oil pre-loaded with carbon black. The wear scar is reported as an average of diameters in both the parallel and perpendicular to the sliding direction. The data reported in examples 32 to 46 is average of the three repeat measurements.

The wear scar diameter measured for the additive compositions of Examples 17 to 31 in formulated oil were compared to formulated oil that does not contain the lubricating oil additive composition of the present invention. The lubricating oil used in Examples 32 to 46 was fully-formulated SAE 5W-30 lubricant oil blended with API Group III base stocks and additives including detergents, dispersants, ZDDP, antioxidants, an anti-foam agent, a pour point depressant, a friction modifier, the additive of the present invention, and a non-functionalized viscosity index improver. The net active content of the additive of the present invention added to the lubricant oil examples are shown in Table 4. The SAE 5W-30 lubricant oil was blended to the kinematic viscosity at 100° C. of ca. 12.2+/−0.3 cSt. The results of the HFRR wear bench test according to the invention are summarized in Table 4.

TABLE 4

HFRR Wear Performance

| Example | Functionalized Product | Polymer | Amine | Net Active Treat Rate, wt % | Avg. Wear Scar diameter, micron |
|---|---|---|---|---|---|
| Comparative | NA | None | None | — | 180 |
| 32-C | 17 | OCP-1 | 2-Naphthol[1] | NA | NA |
| 33 | 18 | OCP-1 | 2-(2-Naphthoxy)ethanol | 0.28 | 154 |

TABLE 4-continued

HFRR Wear Performance

| Example | Functionalized Product | Polymer | Amine | Net Active Treat Rate, wt % | Avg. Wear Scar diameter, micron |
|---|---|---|---|---|---|
| 34-C | 19 | OCP-1 | 2-methoxyethylamine | 0.28 | 180 |
| 35 | 20 | OCP-1 | 2-phenoxyethylamine | 0.28 | 148 |
| 36 | 21 | OCP-1 | 3-phenoxypropylamine | 0.28 | 167 |
| 37 | 22 | OCP-1 | 2-(2-naphthyloxy)ethylamine | 0.28 | 131 |
| 38 | 23 | OCP-1 | 2-(9-anthracenyloxy)ethylamine | 0.28 | 132 |
| 39 | 24 | OCP-1 | 2-(4-phenylphenoxy)ethylamine | 0.5 | 128 |
| 40 | 25 | OCP-1 | 2-(4-phenoxyphenoxy)ethylamine | 0.5 | 129 |
| 41 | 26 | OCP-1 | 2-(2-nonylphenoxy)ethylamine | 0.28 | 197 |
| 42 | 27 | OCP-2 | 2-(2-naphthyloxy)ethylamine | 0.28 | 133 |
| 43 | 28 | OCP-3 | 2-(2-naphthyloxy)ethylamine | 0.28 | 137 |
| 44 | 29 | OCP-4 | 2-(2-naphthyloxy)ethylamine | 0.5 | 172 |
| 45-C | 30 | PBD-1 | 2-(2-naphthyloxy)ethylamine | 0.5 | 190 |
| 46 | 31 | PIP-1 | 2-(2-naphthyloxy)ethylamine | 0.5 | 151 |

[1]No reaction took place thus reactants were not further tested

As indicated previously, attempts to react 2-naphthol with the acylated polymer were unsuccessful, indicating the need for a more reactive coupling agent. The comparison between examples 33 and 37 illustrate that while the ester product resulting from the reaction of the acylated polymer and 2-(2-Naphthoxy)ethanol does positively influence wear performance, the imide linkage resulting from the reaction with 2-(2-naphthyloxy)ethylamine is preferred. Example 34, which contains the product lacking the aromatic functionality did not show any performance over baseline. Examples 35 and 36, which contain additives 20 and 21, indicate both ethyl and propyl alkyl linkers are effective in this invention. Examples 35 and 37 containing polymers 20 and 22 show a benefit to using higher order fused aromatics, such as 2-naphthol. Adding a third aromatic group, as in example 38 (compound 23), does not provide additional benefit in this test. Likewise, examples 39 and 40, containing compounds 24 and 25, show the effectiveness of substitution of phenol with additional aromatic groups. Example 41, containing polymer 26 which has an alkyl substituted phenol, showed significantly worse wear protection the unsubstituted variant. It is hypothesized that bulkier long chain alkyl groups may interfere with π-stacking or other such mechanism which provides for improved wear protection.

Examples 42 and 43 containing copolymers of differing MA content teach that a range of MA content is tolerable. Examples 44, containing the lower molecular weight OCP, shows that lower molecular weight polymers are not as effective as the higher molecular weight analogs and copolymers above 10K Mn are preferred. To further illustrate the importance of molecular weight, the low Mn polybutadiene used in example 45 was ineffective as an antiwear additive in this invention. Finally, Example 46 illustrates that the higher molecular weight polyisoprene functionalized with the 2-(2-naphthyloxy)ethylamine group give moderate results.

Soot Thickening Bench Test

Examples 20, 22, 23 and 27 were further evaluated for percent viscosity increase using a soot thickening bench test, which measures the ability of the formulation to disperse and control viscosity increase resulting from the addition of carbon black, a soot surrogate. Using the soot thickening bench test, the viscosity of a fresh oil is measured in centistokes. The viscosity of the oil containing carbon black is measured according to methods that are well known in the art. The percent viscosity increase is calculated according to the following formula:

% viscosity increase=[(vis$_{cbo}$−vis$_{fo}$)/(vis$_{fo}$)×100]

vis$_{cbo}$: viscosity of carbon black in oil
vis$_{fo}$: viscosity of fresh oil Using the soot thickening bench test, the percent viscosity increase calculated for the additive compositions of Examples 20, 22, 23, and 27 in a formulated oil were compared to a formulated oil that does not contain the lubricating oil additive composition of the present invention. The formulated oil of the present invention comprises 0.66 wt % of an oxidation inhibitor package, 0.33 wt % pour point depressant, 4.07 wt % of a calcium based detergent package containing a phenate and sulfonates, 2.41 wt % zinc dithiophosphate, 0.03 wt % foam inhibitor, 7.7 wt % viscosity index improver and 85.10 wt % of a lube oil blend which is a mixture of basestocks that consists of 69.24 wt % Exxon 150N oil, and 30.76 wt % Exxon 600N oil (all of which may be purchased from ExxonMobil Corporation, Fairfax, Va.) to provide the comparative oil formulation. To prepare the formulated lubricating oil composition of the present invention, approximately 6 wt % of the additive composition (concentrate) made from the backbone and amines as shown in Table 3 was top treated to the formulated comparison oil. The results of the soot thickening bench test are shown in Table 5.

TABLE 5

Soot Dispersancy Bench Test

| Example | Containing Example | Polymer | Amine | % Viscosity Increase |
|---|---|---|---|---|
| 47-C | None | NA | NA | 242 |
| 48 | 20 | OCP-1 | 2-phenoxyethylamine | 181 |
| 49 | 22 | OCP-1 | 2-(2-naphthyloxy)-ethylamine | 40 |
| 50 | 23 | OCP-1 | 2-(9-anthracenyloxy)-ethylamine | 60 |
| 51 | 27 | OCP-2 | 2-(2-naphthyloxy)-ethylamine | 37 |

The examples 47-51 listed in Table 5 illustrate that many of these compounds have excellent soot handling properties as well and this property seems to correlate well with their antiwear performance.

ISB Engine Test

The functionalized polymer from example 27 was further tested in a full-length Cummins® ISB engine test (ASTM D7484-11). The Cummins® ISB test is an industry standard Diesel engine durability test using a Cummins® 5.9 L ISB engine. The test is 350 hr and consists of two stages; a 100 hr soot generation stage, followed by a 250 hr cyclic stage to induce valve train wear. Following the test cycle the engine is dismantled and the Cam and Tappets are analyzed for wear.

The Cam wear is reported in average cam scar width ACSW (μm), and the Tappet is reported as average tappet weight loss ATWL (mg). Pass/fail limits are 55 μm Cam wear and 100 mg Tappet weight loss.

The functionalized polymer from example 27 was tested in a fully formulated 5W30 heavy duty diesel oil formulation at 0.28 wt % neat polymer content-(Example 52, Table 6). The formulation used in this study also contained conventional succinimide dispersants, an overbased calcium phenate detergent, overbased calcium sulfonate detergents, a phenolic antioxidant, a diphenylamine antioxidant, a molybdenum succinimide antioxidant, zinc dithiophosphate, a pour point depressant, and an olefin copolymer viscosity index improver.

TABLE 6

ISB Engine Results

| Example | Containing Example | ACSW (μm) | ATWL (mg) |
|---|---|---|---|
| Reference Oil | N/A | 91 | 115 |
| 52 | 27 | 25 | 82 |

The results shown in Table 7 illustrate a pronounced wear benefit of using a compound from our preferred embodiment on both the Cam and Tappet wear in the Cummins ISB Test.

Mack T11 Engine Test

The functionalized polymer from example 27 was further tested in a full-length Mack™ T11 engine test. The Mack™ T11 test is designed to evaluate the soot handling performance of a given oil. It is a 252 hr test whereby oil samples are taken every 12 hrs and analyzed for soot content and viscosity.

The compound from example 27 was tested in a fully formulated 15W40 Heavy Duty Diesel engine oil at 0.45 wt % neat polymer treat (Example 53, Table 7). The formulation used in this study also contained conventional succinimide dispersants, an overbased calcium phenate detergent, overbased calcium sulfonate detergents; a phenolic antioxidant, a diphenylamine antioxidant, a molybdenum succinimide antioxidant, zinc dithiophosphate, a pour point depressant, and an olefin copolymer viscosity index improver.

TABLE 7

Mack T11 Data
Example 53
Containing Example 27

| Time (hr) | Soot (wt %) | Viscosity Increase (cSt) |
|---|---|---|
| 0 | 0.218 | 1.36 |
| 12 | 0.467 | 0.62 |
| 24 | 0.600 | 0.50 |
| 36 | 0.835 | 0.37 |
| 48 | 1.118 | 0.35 |
| 60 | 1.420 | 0.41 |
| 72 | 1.809 | 0.64 |
| 84 | 2.431 | 0.87 |
| 96 | 2.615 | 0.97 |
| 108 | 2.889 | 1.10 |
| 120 | 3.166 | 1.16 |
| 132 | 3.531 | 1.37 |
| 144 | 3.867 | 1.59 |
| 156 | 4.305 | 1.98 |
| 168 | 4.607 | 2.41 |
| 180 | 4.965 | 2.78 |
| 192 | 5.337 | 3.36 |
| 204 | 5.786 | 4.61 |
| 216 | 6.093 | 5.61 |
| 228 | 6.585 | 7.80 |
| 240 | 7.062 | 17.14 |
| 252 | 7.511 | 39.97 |

What is claimed is:

1. An oil-soluble lubricating oil additive composition prepared by the process which comprises reacting:
    (a) a hydrocarbon polymer having a number average molecular weight ($M_n$) between about 7,000 and about 500,000:
    (b) an ethylenically unsaturated acylating agent; and
    (c) an aryloxy-alkylene amine is of the formula Ar—O-Alk-$NH_2$ wherein Ar is an aromatic moiety selected from benzene, naphthylene or anthracene or optionally substituted benzene, optionally substituted naphthylene or optionally, substituted anthracene, wherein the optionally substituted groups are selected from 1 to 3 substituent groups selected from alkyl, alkenyl, alkoxy, aryl, alkaryl, arylalkyl, aryloxy, wherein alkyl is straight or branched chain carbon having 6 carbon atoms or less; and -Alk- comprises straight and branched chain alkylene groups having 1 to 10 carbon atoms, which may optionally be substituted with a group consisting of phenyl and benzyl.

2. The oil-soluble lubricating oil additive of claim 1, wherein the hydrocarbon polymer is a homopolymer or copolymer selected from the group consisting of: (1) polymers of aliphatic olefins having from 2 to about 28 carbon atoms; (2) polymers of dienes; (3) copolymers of conjugated dienes with vinyl substituted aromatic compounds; and (4) star polymers.

3. The oil-soluble lubricating oil additive of claim 2, wherein the copolymer selected from (1) polymers of aliphatic olefins having from 2 to about 28 carbon atoms wherein one olefin is ethylene.

4. The oil-soluble lubricating oil additive of claim 3, wherein the ethylene content of the copolymer is from 45-52 wt % ethylene.

5. The oil-soluble lubricating oil additive of claim 4, wherein the copolymer is an ethylene-propylene copolymer having a number average molecular weight from 7,000 to about 60,000.

6. The oil-soluble lubricating oil additive of claim 2, wherein the hydrocarbon polymer is an optionally hydrogenated polymer of dienes, wherein the diene is a conjugated diene selected from the group consisting of isoprene, butadiene, and piperylene.

7. The oil-soluble lubricating oil additive of claim 2, wherein the hydrocarbon polymer is an optionally hydrogenated copolymer of a conjugated diene with vinyl substituted aromatic compound wherein the vinyl substituted aromatic compound is a styrenic monomer.

8. The oil-soluble lubricating oil additive of claim 7, wherein the diene is selected from the group consisting of isoprene and 1,3-butadiene.

9. The oil-soluble lubricating oil additive of claim 2, wherein the hydrocarbon polymer is a star polymer wherein the arms are derived from dienes and vinyl substituted aromatic compounds.

10. The oil-soluble lubricating oil additive of claim 1, wherein the ethylenically unsaturated carboxylic acid or functional derivative thereof, comprises at least one member of the group consisting of acrylic acid, crotonic acid, methyacrylic acid, maleic acid, maleic anhydride, fumaric acid, itaconic acid and itaconic anhydride, citraconic acid, citraconic anhydride, mesaconic acid, glutaconic acid, chloromaleic acid, aconitic acid, methylcrotonic acid, sorbic acid, and ester of the acids, and combinations of the foregoing.

11. The oil-soluble lubricating oil additive of claim 1, wherein grafting of the hydrocarbon copolymer is conducted at about 100° C. to about 250° C. in the presence of a free radical initiator.

12. The oil-soluble lubricating oil additive of claim 11, wherein the hydrocarbon polymer backbone has been functionalized with a maleic anhydride acylating agent in the range of 0.5 to 3.0 wt % of Maleic anhydride based upon the total mass of polymer.

13. The oil-soluble lubricating oil additive of claim 1, wherein the ethylenically unsaturated carboxylic acid or, functional derivative thereof is first reacted with the aryloxy-alkylene amine to form a reaction product wherein the reaction product is grafted to the polymer backbone.

14. The oil-soluble lubricating oil additive of claim 1, wherein the aryloxy-alkylene amine is of the formula Ar—O-Alk-$NH_2$ is selected herein Ar is an aromatic moiety selected from benzene, naphthylene and anthracene.

15. The aryloxy-alkyene amine of claim 14, wherein Ar is selected from naphthylene and anthracene.

16. The oil-soluble lubricating oil additive of claim 1, wherein the aryloxy-alkylene amine is of the formula Ar—O-Alk-$NH_2$ is selected wherein Ar is an aromatic moiety contains at least two aromatic groups either fused or linked by a carbon to carbon bond, alkylene linkage, ether linkage, ester linkage, or keto linkage.

17. The oil-soluble lubricating oil additive of claim 1, wherein the aryloxy-alkylene amine is of the formula Ar—O-Alk-$NH_2$ is selected wherein Ar is an substituted aromatic moiety selected from group consisting of substituted benzene, substituted naphthylene and substituted anthracene, wherein the substituted groups selected from 1 to 3 substituent groups selected from alkyl, alkoxy, aryl, alkaryl, arylalkyl, aryloxy, wherein alkyl is straight or branched chain carbon having 1 to 6 carbon atoms.

18. The aryloxy-alkylene amine of claim 17, wherein the Ar has a single substituent group selected from aryl, alkaryl, arylalkyl, and aryloxy.

19. The oil-soluble lubricating oil additive of claim 1, wherein the aryloxy-alkylene amine is of the formula Ar—O-Alk-$NH_2$ is selected wherein Alk is —$CH_2CH(R_o)$— wherein $R_o$ is selected from the group consisting of hydrogen, a straight or branched chain alkyl group having 1 to 6 carbon atoms, aryl and arylalkyl.

20. The oil-soluble lubricating oil additive of claim 1, wherein the aryloxy-alkylene amine is of the formula Ar—O-Alk-$NH_2$ is selected wherein Alk is selected from the group —$CH_2CH_2$—, —$CH_2CH_2(CH_3)$—, —$CH_2CH_2CH_2$—, and —$CH_2CH_2(CH_3)CH_2$—.

21. An additive concentrate comprising an inert liquid organic diluent and from about 3 to 50 percent by weight of the oil soluble lubricating oil additive of claim 1.

22. The additive concentrate of claim 21, wherein the inert liquid organic diluent is a diluent oil selected from a Group II, Group III Group IV or Group V base oil or a mixture thereof, or a mixture of a Group I base oil and at least one Group II, Group II or Group IV base oil.

23. A lubricating oil composition comprising a major amount of an oil of lubricating viscosity and a minor amount of the oil soluble lubricating oil additive of claim 1.

24. The lubricating oil composition of claim 23, further comprising at least one additive selected from the group consisting of antioxidants, antiwear agents, detergents, dispersants, friction modifiers, corrosion and rust inhibitors, viscosity index improvers and anti-foam agents.

25. The lubricating oil composition of claim 24, wherein the at least one additives are selected for use as a heavy duty diesel engine lubricating oil composition.

* * * * *